United States Patent
McKay et al.

(10) Patent No.: US 10,072,638 B2
(45) Date of Patent: Sep. 11, 2018

(54) THERMAL PULSE ENERGY HARVESTING

(71) Applicant: Massachusetts Institute of Technology, Cambridge, MA (US)

(72) Inventors: Ian McKay, Seattle, WA (US); Evelyn Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1115 days.

(21) Appl. No.: 14/151,224

(22) Filed: Jan. 9, 2014

(65) Prior Publication Data
US 2014/0298811 A1 Oct. 9, 2014

Related U.S. Application Data

(60) Provisional application No. 61/750,540, filed on Jan. 9, 2013.

(51) Int. Cl.
*F03G 7/04* (2006.01)
*F01N 5/02* (2006.01)
*F03G 7/06* (2006.01)

(52) U.S. Cl.
CPC ............... *F03G 7/04* (2013.01); *F01N 5/025* (2013.01); *F03G 7/06* (2013.01); *Y02T 10/16* (2013.01)

(58) Field of Classification Search
None
See application file for complete search history.

(56) References Cited

U.S. PATENT DOCUMENTS

| | | | | |
|---|---|---|---|---|
| 4,254,906 A | * | 3/1981 | Hayes | G05D 23/24 236/68 B |
| 6,192,687 B1 | * | 2/2001 | Pinkerton | H02J 7/34 60/646 |
| 6,588,419 B1 | * | 7/2003 | Buezis | F24B 1/187 126/500 |

* cited by examiner

*Primary Examiner* — Mark Laurenzi
*Assistant Examiner* — Wesley Harris
(74) *Attorney, Agent, or Firm* — Steptoe & Johnson LLP

(57) ABSTRACT

A device for thermal energy harvesting can use pulsed heat.

29 Claims, 29 Drawing Sheets

THERMAL PULSE ENERGY HARVESTING

PRIORITY CLAIM

This application claims priority to U.S. Provisional Application No. 61/750,540, filed Jan. 9, 2013, which is incorporated by reference in its entirety.

FEDERALLY SPONSORED RESEARCH OR DEVELOPMENT

This invention was made with government support under Grant No. DE-AR0000185 awarded by the Department of Energy. The government has certain rights in the invention.

TECHNICAL FIELD

The invention features an energy harvesting system.

BACKGROUND

Thermal energy is the energy a substance or system has related to its temperature. Thermal energy may be produced by processes, such as industrial and manufacturing processes, and also machines, such as automobiles and equipment. An energy harvesting system can receive thermal energy from a hot region and transfer a portion of the received thermal energy to a different form or use the received energy to perform a useful task.

SUMMARY

In general, a device for thermal energy harvesting can use pulsed heat. For example, a method for adapting the effective thermal resistance of a heat engine can include introducing pulsed heat transfer across the heat engine, with the goal of maintaining an optimal temperature difference across the heat engine. The maintenance of optimal temperature does not depend or otherwise rely on incident heat flux.

In one aspect, a device for thermal energy harvesting can include a heat source that generates pulsed heat, a heat engine thermally connected to the heat source by a first thermal conduit, and a heat sink thermally connected to the heat engine by a second thermal conduit. The first thermal conduit and the second thermal conduit can be different. The heat source can configure to achieve pulsed heat transfer across the heat engine, the heat engine can convert the pulsed heat, and the heat sink can dissipate heat.

In certain embodiments, the pulsed heat can be produced by a pulsed heat flux. The pulsed heat flux can include a system that produces periodic heat, and the system can include a periodically burning gas heater. The pulsed heat flux can also include an intermittently flowing heat transfer fluid, or an oscillating heat flux.

In certain embodiments, when the pulsed heat flux is on, the rate of temperature change for the heat source can vary. The rate of temperature change for the heat source can be defined as:

$$\frac{dT_S}{dt}\bigg|_{closed} = \frac{Q}{m_s c_s} - \frac{(T_S - T_R)}{R_E m_s c_s}$$

wherein closed means that the pulsed heat flux is on, Q is input power, $m_s$ is mass of the heat source, $c_s$ is specific heat of the heat source, $T_S$ is the temperature of the heat source, $T_R$ is the temperature of the heat sink, and $R_E$ is the thermal resistance of the heat engine.

In certain embodiments, when the pulsed heat flux is off, the rate of temperature change for the heat source can vary. The rate of temperature change for the heat source can be defined as:

$$\frac{dT_S}{dt}\bigg|_{open} = \frac{(T_S - T_R)}{R_E m_s c_s}$$

wherein open means that the pulsed heat flux is off, $T_S$ is the temperature of the heat source, $T_R$ is the temperature of the heat sink, $R_E$ is the thermal resistance of the heat engine, $m_s$ is the mass of the heat source, and $C_s$ is the specific heat of the heat source.

In certain embodiments, the rate of temperature change for the heat sink can vary. And the rate of temperature change for the heat sink can be defined as:

$$\frac{dT_R}{dt}\bigg|_{open/closed} = (1-\eta_E)\frac{(T_S - T_R)}{R_E m_R c_R} - \frac{(T_R - T_\infty)}{R_E m_R c_R}$$

wherein open means that the pulsed heat flux is off, closed means that the pulsed heat flux is on, $\eta_E$ is heat engine efficiency, $T_S$ is the temperature of the heat source, $T_R$ is the temperature of the heat sink, $R_E$ is the thermal resistance of the heat engine, $m_R$ is the mass of the heat sink, $c_R$ is the specific heat of the heat source, $T_\infty$ is ambient temperature, and $R_R$ is the thermal resistances between the heat sink and ambient.

In certain embodiments, the heat source can have a bulk Fourier number that is characteristic heating time scale for the heat source and the heat sink can have a bulk Fourier number that is characteristic cooling time scale for the heat sink.

In certain embodiments, increasing the bulk Fourier number of the heat sink can improve energy conversion efficiency.

In certain embodiments, a smaller bulk Fourier number of the heat sink can be preferred to improve output power.

In certain embodiments, phase lag can be maximized at a low bulk Fourier number of the heat source.

In certain embodiments, power and efficiency optimum can be at an intermediate bulk Fourier number of the heat source, heat source temperature close to maximum temperature and small phase lag.

In certain embodiments, both power and efficiency can increase with increasing bulk Fourier number of the heat source until the bulk Fourier number of the heat source reaches 1.

In certain embodiments, when the bulk Fourier number of the heat source is smaller than 1 (such as significantly smaller than 1), energy storage ratio is smaller than 1 (such as significantly smaller than 1), the heat flux is delivered as sharply declining pulse, and the heat flux is on, the rate of temperature change for the heat sink can vary. The rate of temperature change for the heat sink can be defined as:

$$\frac{dT_R}{dt}\bigg|_{closed} = (1-<\eta_E>)\frac{T_{max} - T_R(t)}{T_E m_R c_R} - \frac{T_R(t) - T_\infty}{R_R m_R c_R}$$

$$\left(<\eta_E> = \frac{\int_0^{t_c} \alpha(1 - T_R(t)/T_{max})dt}{t_c}\right)$$

wherein closed means that the pulsed heat flux is on, $T_R$ is the temperature of the heat sink, $\eta_E$ is heat engine efficiency, $T_{max}$ is maximum temperature, $T_R(t)$ is the temperature of the heat sink at different time, $T_E$ is the temperature of the heat engine, $m_R$ is the mass of the heat sink, $c_R$ is the specific heat of the heat source, $T_\infty$ is ambient temperature, $R_R$ is the thermal resistances between the heat sink and ambient, $t_c$ is time when the heat flux is on, and $\alpha$ is fraction of Carnot efficiency.

In certain embodiments, when the bulk Fourier number of the heat source is smaller than 1 (such as significantly smaller than 1), the energy storage ratio is smaller than 1 (such as significantly smaller than 1), and the heat flux is delivered as sharply declining pulse, the temperature of the heat sink can change with time. The temperature of the heat sink at different time can be defined as:

$$T_R(t) = \frac{R_E T_\infty + R_R T_{max}(1 - <\eta_E>)}{R_E + R_R(1 - <\eta_E>)} + Ke^{t\frac{(R_E + R_R(1 - <\eta_E>))}{m_R c_R R_R R_E}}$$

$$\left(K = \frac{-e\frac{t_c}{m_R c_R R_R}\left(e\frac{t_o}{m_R c_R R_R} - 1\right)R_R(T_\infty - T_{max})(1 - <\eta_E>)}{\left(e\frac{t_c + t_o}{m_R c_R R_R} - e\frac{t_c(1 - <\eta_E>)}{m_R c_R R_E}\right)(R_R + R_R(1 - <\eta_E>))}\right)$$

wherein $T_R(t)$ is the temperature of the heat sink at different time, $R_E$ is the thermal resistance of the heat engine, $T_\infty$ is ambient temperature, $R_R$ is the thermal resistances between the heat sink and ambient, $T_{max}$ is maximum temperature, $\eta_E$ is heat engine efficiency, e is a constant, $m_R$ is the mass of the heat sink, $c_R$ is the specific heat of the heat source, $t_c$ is time when the heat flux is on, and $t_o$ is time when the heat flux is off.

In certain embodiments, when engine-sink thermal resistance ratio is smaller than 1, pulse mode can surpass steady-state performance in both power and efficiency.

In certain embodiments, the heat source can include an oscillating thermal switch configured to interface a contact heat source. The oscillating thermal switch can be between a constant heat source and a heat engine. The oscillating thermal switch can include bistable thermal-fluid circuits. The oscillating thermal switch can include a Tamburini T-system.

In certain embodiments, varying duty cycle of the oscillating thermal switch can adjust thermal gradient.

In certain embodiments, when the oscillating thermal switch is closed, the rate of temperature change for the heat source can vary, and the rate of scaled temperature change for the heat source can vary. The rate of temperature change for the heat source and the rate of scaled temperature change for the heat source can be defined as:

$$\frac{dT_S}{dt}\bigg|_{closed} = \frac{Q}{m_s c_s} - \frac{(T_S - T_R)}{R_E m_s c_s}$$

$$\frac{dT_S^*}{dt^*}\bigg|_{closed} = \frac{Fo_1}{Fo_2}R^*C^* - Fo_1(T_S^* - T_R^*)$$

wherein closed means that the oscillating thermal switch is closed, Q is input power, $T_S$ is the temperature of the heat source, $T_R$ is the temperature of the heat sink, $R_E$ is the thermal resistance of the heat engine, $m_s$ is the mass of the heat source, $C_s$ is the specific heat of the heat source, $Fo_1$ is a bulk Fourier number that is characteristic heating time scale for the heat source, $Fo_2$ is a bulk Fourier number that is characteristic cooling time scale for the heat sink, $R^*$ is engine-sink thermal resistance ratio, $C^*$ is source-sink energy storage ratio, $T_S^*$ is scaled temperature of the heat source, and $T_R^*$ is scaled temperature of the heat sink.

In certain embodiments, when the oscillating thermal switch is closed, the rate of temperature change for the heat sink can vary, and the rate of scaled temperature change for the heat sink can vary. The rate of temperature change for the heat sink and the rate of scaled temperature change for the heat sink can be defined as:

$$\frac{dT_R}{dt}\bigg|_{closed} = (1 - \eta_E)\frac{(T_S - T_R)}{R_E m_R c_R} - \frac{(T_R - T_\infty)}{R_R m_R c_R}$$

$$\frac{dT_R^*}{dt^*}\bigg|_{closed} = Fo_1 C^*[(1 - \eta_E)(T_S^* - T_R^*) - R^*(T_R^* - T_\infty^*)]$$

wherein closed means that the oscillating thermal switch is closed, $\eta_E$ is heat engine efficiency, $T_S$ is the temperature of the heat source, $T_R$ is the temperature of the heat sink, $R_E$ is the thermal resistance of the heat engine, $m_R$ is the mass of the heat sink, $c_R$ is the specific heat of the heat source, $T_\infty$ is ambient temperature, $R_R$ is the thermal resistances between the heat sink and ambient, $T_R^*$ is scaled temperature of the heat sink, $Fo_1$ is a bulk Fourier number that is characteristic heating time scale for the heat source, $C^*$ is source-sink energy storage ratio, $T_S^*$ is scaled temperature of the heat source, $R^*$ is engine-sink thermal resistance ratio, and $T_\infty$ is scaled ambient temperature.

In certain embodiments, boundary conditions for switch-open phase can be when the heat source warms in isolation and the heat sink cools towards ambient temperature. Equations of the boundary conditions for switch-open phase can be:

$$\frac{dT_S^*}{dt^*}\bigg|_{open} = \delta \longrightarrow T_S^*(0) = 1$$

$$\frac{dT_R^*}{dt^*}\bigg|_{open} = -Fo_2(T_R^* - T_\infty^*) \longrightarrow T_R^*(0) = T_\infty^* + (T_R^*(-1/\delta) - T_\infty^*)e^{-Fo_2}$$

wherein open means that the oscillating thermal switch is open, $T_S^*$ is scaled temperature of the heat source, $\delta$ is duty ratio, $T_R^*$ is scaled temperature of the heat sink, $Fo_2$ is a bulk Fourier number that is characteristic cooling time scale for the heat sink, $T_\infty^*$ is scaled ambient temperature, e is a constant, $T_S^*(0)$ is scaled temperature of the heat source at boundary conditions, and $T_R^*(0)$ is scaled temperature of the heat sink at boundary conditions.

In certain embodiments, a maximum efficiency can be expected at maximum possible value of the bulk Fourier number of the heat sink, and minimum value of the bulk Fourier number of the heat source, and duty ratio is set to keep the maximum temperature of the heat source as close as possible to the temperature tolerance of the device.

In certain embodiments, when the energy storage ratio is close to zero and heat sink temperature is practically constant, energy conversion temperature gradient can vary. The energy conversion temperature gradient can be defined as:

$$\frac{T_S}{T_R} = 1 + \frac{Q}{T_R}\left(R_E + \frac{t_o}{m_s c_s} \frac{e^{\frac{t_c-t}{R_E m_s c_s}}}{e^{\frac{t_c}{R_E m_s c_s}} - 1}\right)$$

wherein $T_S$ is the temperature of the heat source, $T_R$ is the temperature of the heat sink, Q is input power, $R_E$ is the thermal resistance of the heat engine, $t_o$ is time when the heat flux is off, $m_s$ is the mass of the heat source, $c_s$ is the specific heat of the heat source, $t_c$ is time when the heat flux is on, e is a constant, and t is time.

In certain embodiments, the heat engine can include a thermoelectric generator. In certain embodiments, the device can include a thermal resistor between the heat source and the heat sink. In certain embodiments, the device can include a thermal resistor between the heat sink and ambient blocks. In certain embodiments, a device of a gas-fired chiller can include a pulsed heat flux device. In certain embodiments, a device of an energy converter can include a pulsed heat flux device.

In another aspect, a method for harvesting thermal energy can include inducing pulsed heat flow, wherein inducing pulsed heat flow can comprise interfacing a constant heat source with an oscillating thermal switch and positioning the oscillating thermal switch between a constant heat source and a heat engine.

In another aspect, a device that generates pulsed heat can comprise an evaporator region, a condenser connected by a liquid conduit and a vapor conduit to the evaporator region to form a circuit, and a flap in the circuit, wherein the flap opens to allow vapor flow from the evaporator to the condenser when pressure exceeds a critical pressure corresponding to a predetermined temperature of the evaporator.

In certain embodiments, the evaporator can be configured to receive heat energy from a heat source and the condenser can be adjacent to an energy harvester configured to withdraw heat energy from the condenser.

In certain embodiments, the liquid conduit can include a wicking material.

Other aspects, embodiments, and features will be apparent from the following description, the drawings, and the claims.

DETAILED DESCRIPTION

Figure 1:
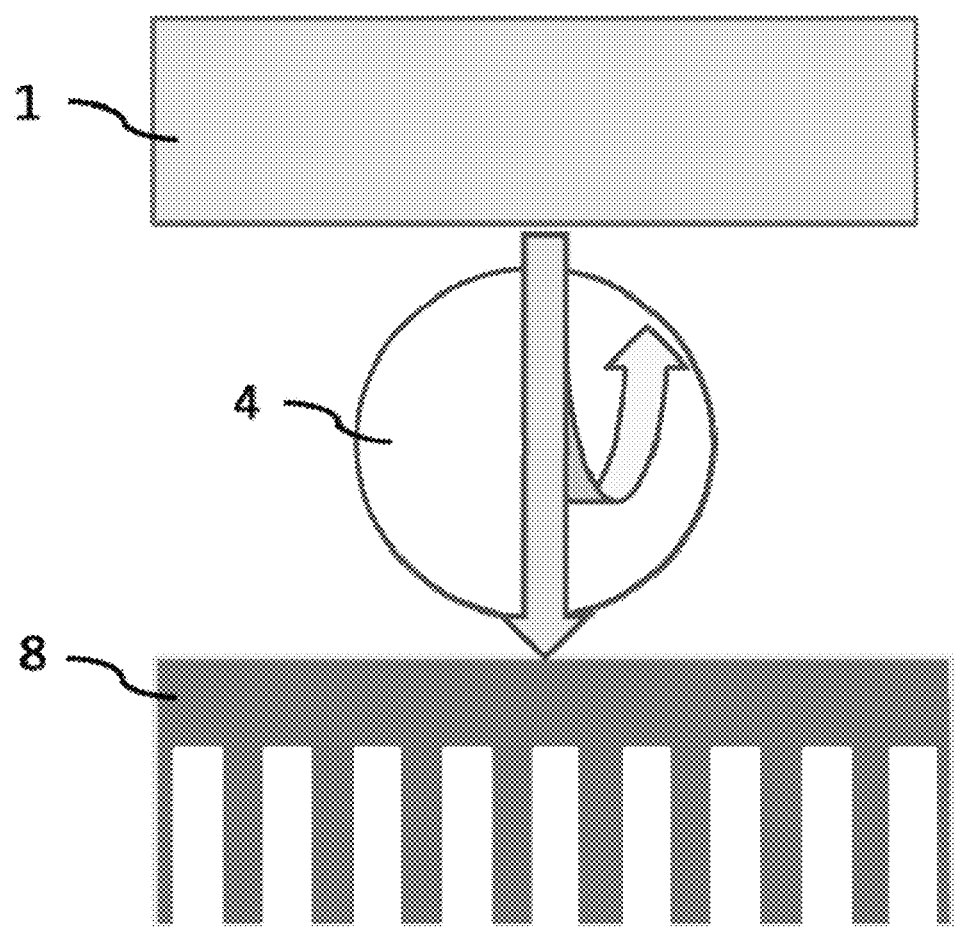
FIG. 1 is a schematic drawing of a thermal energy harvesting system.

Thermal energy may be produced by industrial, assembly, and manufacturing processes. Automobiles, small equipment, and heavy equipment also produce thermal energy. Some of this thermal energy is waste heat, which is heat for which no useful application is found or planned, and is generally a waste by-product. An energy harvesting system can include an element configured to receive thermal energy from a hot region and transfer a portion of the received thermal energy to a different form or use the received energy to perform a useful task. FIG. 1 is a schematic drawing of a thermal energy harvesting system. As shown in FIG. 1, a heat source 1 generates thermal energy, a heat engine 4 converts heat or thermal energy, and a heat sink 8 dissipates part of the heat or thermal energy. The heat engine can be thermally connected to the heat source by a first thermal conduit, and the heat sink can be thermally connected to the heat engine by a second thermal conduit. The heat source can configure to achieve pulsed heat transfer across the heat engine. The first thermal conduit and the second thermal conduit are different.

A device with pulsed heat transfer can enhance thermal energy harvesting. By inducing periodically pulsed heat flow between a heat source and a heat sink, the device allows an energy harvester to operate at its maximum power and efficiency, even when the available energy flux does not match the energy harvester's design point. As such, the device represents a thermal implementation of the maximum power point tracking strategy that is common in electrical systems. The thermal pulse strategy could allow a 10-50% increase in the power and efficiency of a variety of systems that convert thermal energy, from solar-thermal power plants and waste heat harvesters to the radioisotope power systems on many spacecraft.

Thermal energy is ubiquitous in nature, and thermal energy harvesters have emerged as a popular choice for many remote power applications. See, for example, Gur I. et al., *Science* 2012, 335, 145455; and Hall, W., *Handbook of thermoelectrics CRC Press* 1995, 503, each of which is incorporated by reference in its entirety. The performance of these systems, however, can be limited by the division of an overall steady-state temperature gradient between a heat engine and a heat sink, which confines the maximum figure of merit to scale with the engine-sink thermal resistance ratio. See, for example, Sonntag R. et al., *Fundamentals of thermodynamics* 6$^{th}$ ed. 2003, 232; Bierschenk J., *Optimized thermoelectrics for energy harvesting applications, Energy harvesting technologies* 2009, 337-49, each of which is incorporated by reference in its entirety. Since heat sink resistance is typically size-dependent, this limitation is often reflected as a tradeoff between efficiency and power density in energy harvester design. See, for example, Snyder G., *Energy harvesting technologies* 2009, 325-36, which is incorporated by reference in its entirety. This tradeoff in turn impacts the performance of a variety of crucial thermal systems, including waste heat energy harvesters, combustion-based harvesters used in remote areas, concentrated solar power (CSP) generators, and the radioisotope power systems (RPS) on many spacecraft. See, for example, Gur I. et al., *Science* 2012, 335, 145455; Snyder G., *Thermoelectric energy harvesting. Energy harvesting technologies* 2009, 325-36; Mason L., *Journal of propulsion and power* 2007, 23, 1075-79; and Wagner M. et al., *Assessing the impact of heat rejection technology on CSP plant revenue, SolarPACES* 2010, each of which is incorporated by reference in its entirety.

The challenge of high rejection-side temperature can be reduced in certain cases if the harvester receives thermal energy in distinct pulses, rather than operating at steady state. By taking advantage of the thermal impedances of the heat source and sink, pulsed heat transfer allows the maximum thermal gradients and heat fluxes in the system to be synchronized. The resulting phase lag between the system hot and cold side temperatures can allow a heat engine to work over a large thermal gradient, despite a conventionally unfavorable engine-sink thermal resistance ratio. This approach theoretically reduces the power and efficiency loss associated with the temperature drop across the heat sink in steady state operation. The thermal pulse mode may therefore enable the development of more effective energy harvesting systems and allow more flexibility in system design, especially for small-scale systems and those that process time-variant heat fluxes.

Figure 2A:
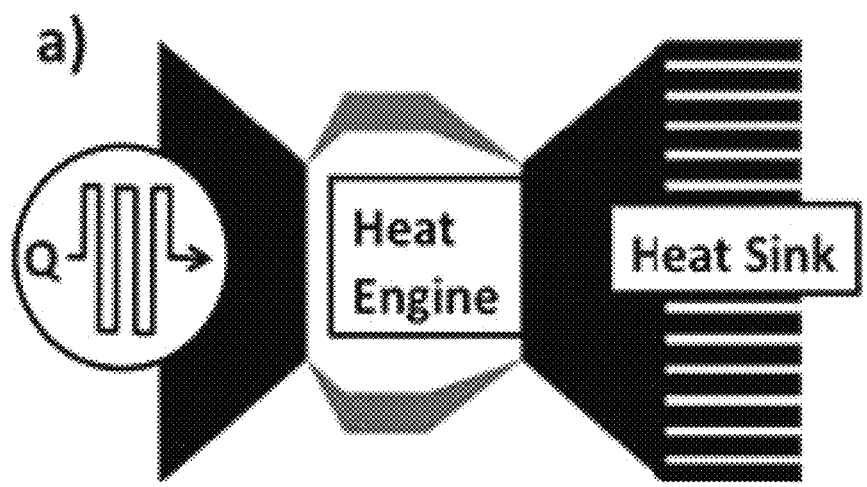
FIG. 2a shows a generalized energy harvester using a pulsed heat source to achieve pulsed heat transfer across a heat engine.
Figure 2B:
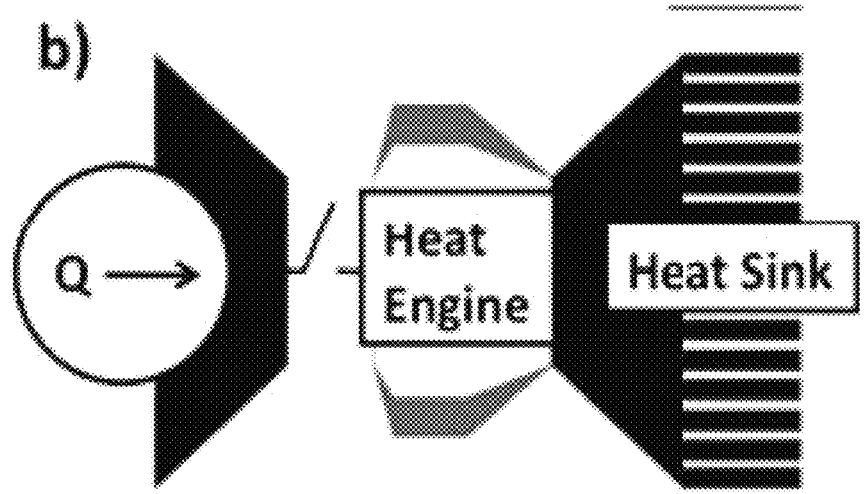
FIG. 2b shows a generalized energy harvester using an oscillating thermal switch (OTS) to achieve pulsed heat transfer across a heat engine.
Figure 2C:
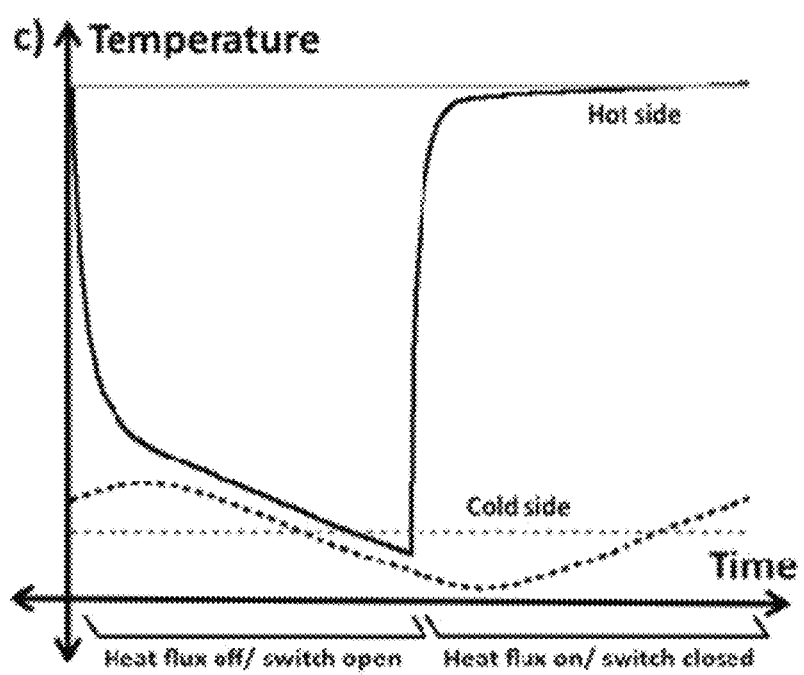
FIG. 2c depicts schematic temperature traces showing heat engine hot side (solid) and cold side (dotted) temperatures with a pulsed heat source (black) and a steady heat source (gray) with the same time-averaged heat flux Q.

An energy harvester can operate in a thermal pulse regime either by coupling to a pulsed heat flux (PHF), or by interfacing a constant heat source with an oscillating thermal switch (OTS). FIG. 2 illustrates the effect of the thermal pulse mode schematically, and introduces two methods for inducing pulsed heat transfer. Generalized energy harvesters using a pulsed heat source and an oscillating thermal switch to achieve pulsed heat transfer across a heat engine are depicted in FIG. 2a and FIG. 2b. In FIG. 2c, schematic temperature traces show heat engine hot side (solid) and cold side (dotted) temperatures with a pulsed heat source (black) and a steady one (gray) with the same time-averaged heat flux Q. A pulsed heat source is a heat source that generates a pulsed heat flux. A steady heat source does not deliver thermal energy in distinct pulses. Examples of the PHF configuration of FIG. 2a include a periodically burning gas heater, intermittently flowing heat transfer fluid, or any other oscillating heat flux. Periodical heat means that heat is produced at regular or irregular intervals. Intermittently flowing heat means that heat flow starts and stops at intervals. In oscillating heat flux, the heat input changes between a maximum value and a minimum value. Examples of the OTS configuration of FIG. 2b include any oscillating thermal connection between a constant heat source and a heat engine, i.e., bistable thermal-fluid circuits such as the Tamburini T-system. See, for example, Weislogel M., *AIP Conf Proc.* 2002, 608, 241-48, which is incorporated by reference in its entirety. The coupling between the hot-side temperature and overall heat flux in the OTS configuration leads to behavior that is distinct from that of the PHF. By cycling between low and high thermal resistance states, the switch acts as variable thermal impedance that in theory generates no entropy. By varying the duty cycle of the switch, the thermal gradient can be adjusted to optimize the conversion efficiency of the heat engine, regardless of the engine thermal resistance or the source heat production.

Figure 3:
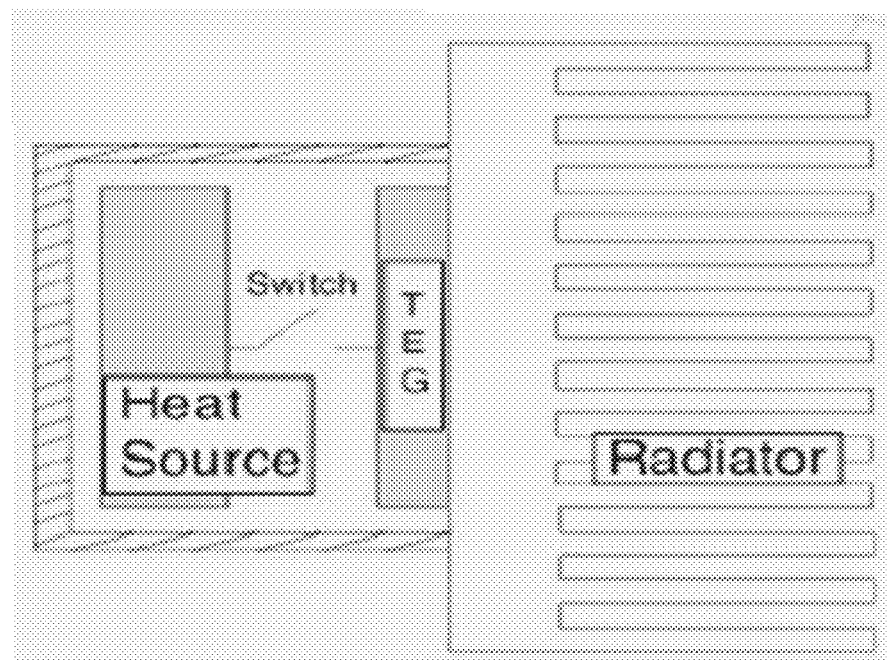
FIG. 3 shows a thermal energy harvester with enclosed heat source.

A thermal energy harvester can use an oscillating thermal switch with enclosed heat source (FIG. 3). The harvester can take advantage of low transient radiator impedance; at resonant frequency, thermal gradient can be concentrated over engine rather than split between engine and radiator. The harvester can also enhance temperature gradient over heat engine by concentrating thermal energy in the time domain.

To study thermal pulse, two models are developed, one for the PHF configuration and one for the OTS configuration. The meanings of symbols and variables used for these models are:

A Cross-sectional area (m$^2$)
Bi Biot Number
c Specific heat capacity (J/kgK)
C* Energy storage ratio $m_S c_S / m_R c_R$
D Duty cycle $t_c/(t_o+t_3)$
Fo Lumped Fourier number t/(Rmc)
K Integration constant (K)
L Characteristic length (m)
m Mass (kg)
P Output power (W)
P* Scaled output power $PR/(T_\infty)$
Q, q Input power (W)
Q* Scaled power $QR/(T_\infty)$
R Effective thermal resistance (K/W)
T Temperature (K)
T* Scaled temperature $(T-T_{S,min})/(T_{S,max}-T_{S,min})$ t time (s)
t* Scaled time $t/t_c$
α Fraction of Carnot efficiency
∂ Duty ratio $t_o/t_c$
OTS Oscillating Thermal Switch
PHF Pulsed Heat Flux
RPS Radioisotope Power System
Subscripts:
c Switch closed phase (heat flux on)
E Heat engine
Max Maximum value
Min Minimum value
o Switch open phase (heat flux off)
R Heat rejection
S Heat source
SS Steady-state heat transfer
SW Switch
∞ Ambient condition A Model for Pulsed Heat Flux (PHF)

A generalized lumped model is developed for the PHF configuration (FIG. 4a), consisting of a heat source, heat engine, and heat sink. It is assumed that there is negligible thermal energy storage inside the heat engine, that the internal impedances of the heat source and sink are small relative to that of the heat engine (Bi<<1), and that the heat production Q is a continuous square wave, with $Q=Q_o$ for time $0<t<t_c$ and $Q=0$ from $t_c<t<t_o$, where $t_c$ is the duration of the thermal pulse and $t_o$ the time between pulses. The temperature, mass, and specific heat of the heat source and sink are $T_S$ and $T_R$, $m_S$ and $m_R$, $c_S$ and $c_R$, respectively. The thermal resistances of the heat engine and between the heat sink and ambient are $R_E$ and $R_R$. Seven non-dimensional parameters describe the PHF system: the engine-sink thermal resistance ratio $R^*=R_E/R_R$, the source-sink energy storage ratio $C^*=m_S c_S/m_R c_R$, power production $Q^*=Q\, R_E/T_\infty$ and the bulk Fourier numbers $Fo_1=t_c/(R_E m_S c_S)$ and $Fo_2=t_o/(R_R m_R c_R)$, which are characteristic heating or cooling time scales for the source and heat sink, respectively. Thus, bulk Fourier number one is characteristic heating time scale for the heat source, and bulk Fourier number two is characteristic cooling time scale for the heat sink. The heat engine efficiency $\eta_E$ is also defined and assumed to scale by a constant factor α with the Carnot efficiency, $\eta_E=\alpha(1-T_R/T_S)$.

Figure 4A:
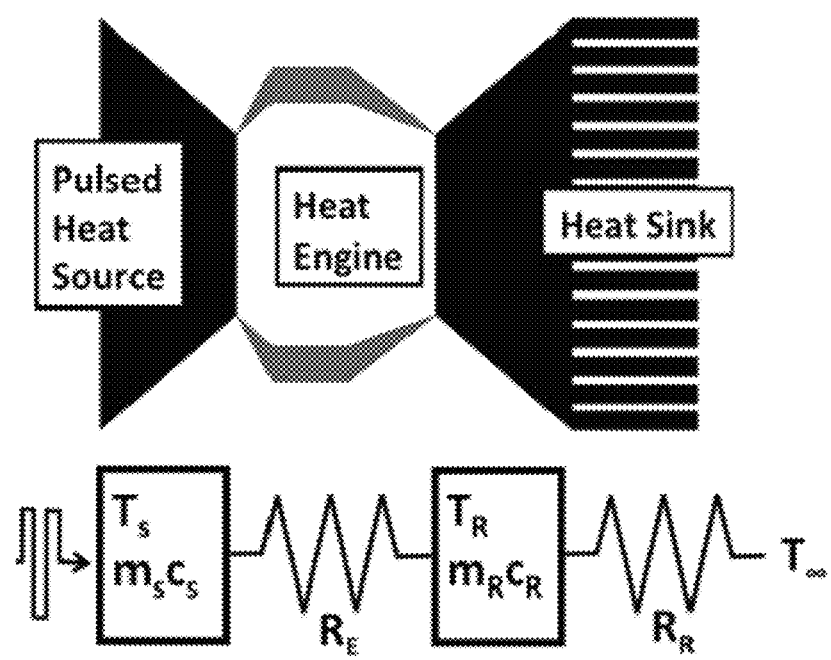
FIG. 4a shows pulsed heat flux (PHF) system (top) and a corresponding lumped-parameter model (bottom)
Figure 4B:
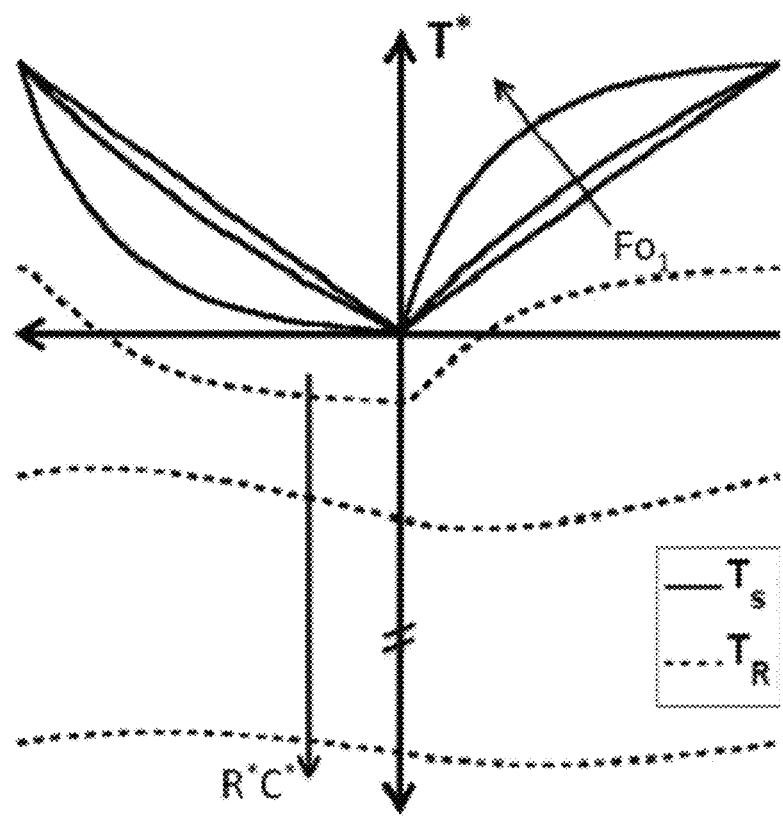
FIG. 4b shows non-dimensional temperature traces of the source and sink, where temperature $T^* = (T-T_{S,min})/(T_{S,max}-T_{S,min})$ and time $t^* = t/t_c$, for temperature swing $(T_{S,min}-T_{S,min})$ and switch closed (heat flux on) time $t_c$, and the traces are shown for different values of the dimensionless time scale $Fo_1$ and impedance ratio $R^*C^*$.

FIG. 4a shows PHF system (top) and a corresponding lumped-parameter model (bottom). FIG. 4b shows non-dimensional temperature traces of the source and sink, where temperature $T^*=(T-T_{S,min})/(T_{S,max}-T_{S,min})$ and time $t^*=t/t_c$, for temperature swing $(T_{S,max}-T_{S,min})$ and switch closed (heat flux on) time $t_c$. The traces are shown for different values of the dimensionless time scale $Fo_1$ and impedance ratio $R^*C^*$.

The energy equations that describe the closed (heat flux on) and open (heat flux off) phases are:

$$\left.\frac{dT_S}{dt}\right|_{closed} = \frac{Q}{m_s c_s} - \frac{(T_S - T_R)}{R_E m_s c_s} \quad (1)$$

$$\left.\frac{dT_S}{dt}\right|_{open} = \frac{(T_S - T_R)}{R_E m_s c_s} \quad (2)$$

$$\left.\frac{dT_R}{dt}\right|_{open/closed} = (1-\eta_E)\frac{(T_S - T_R)}{R_E m_R c_R} - \frac{(T_R - T_\infty)}{R_R m_R c_R} \quad (3)$$

Figure 5A:
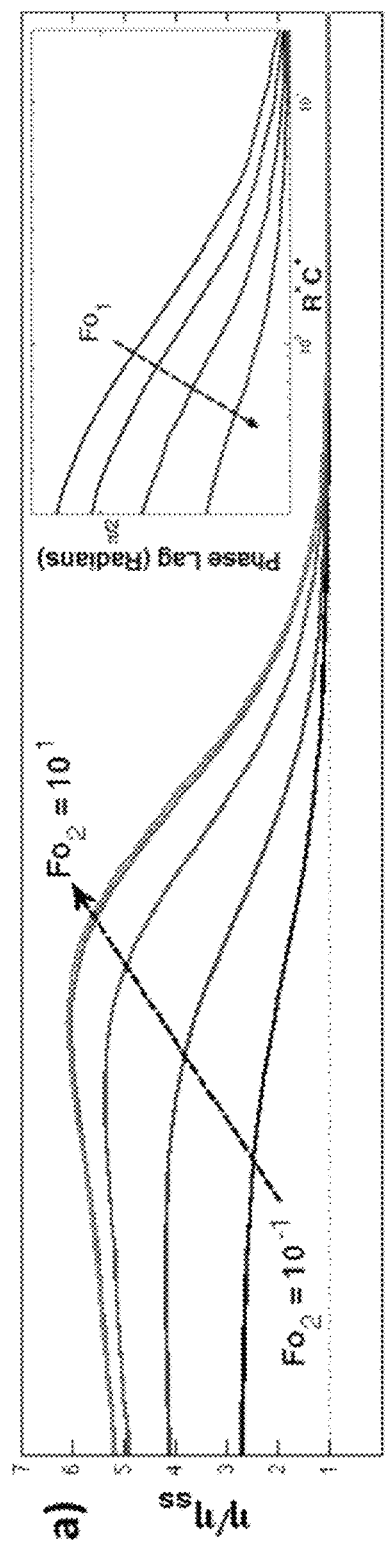
FIG. 5a shows Efficiency η and FIG. 5b shows output power P of PHF energy conversion with $Fo_1$ and $Fo_2$, normalized to the steady-state performance $P_{SS}$ and $\eta_{SS}$ under the same conditions; the inset shows the phase lag between the minimum values of the heat source and sink.
Figure 5B:
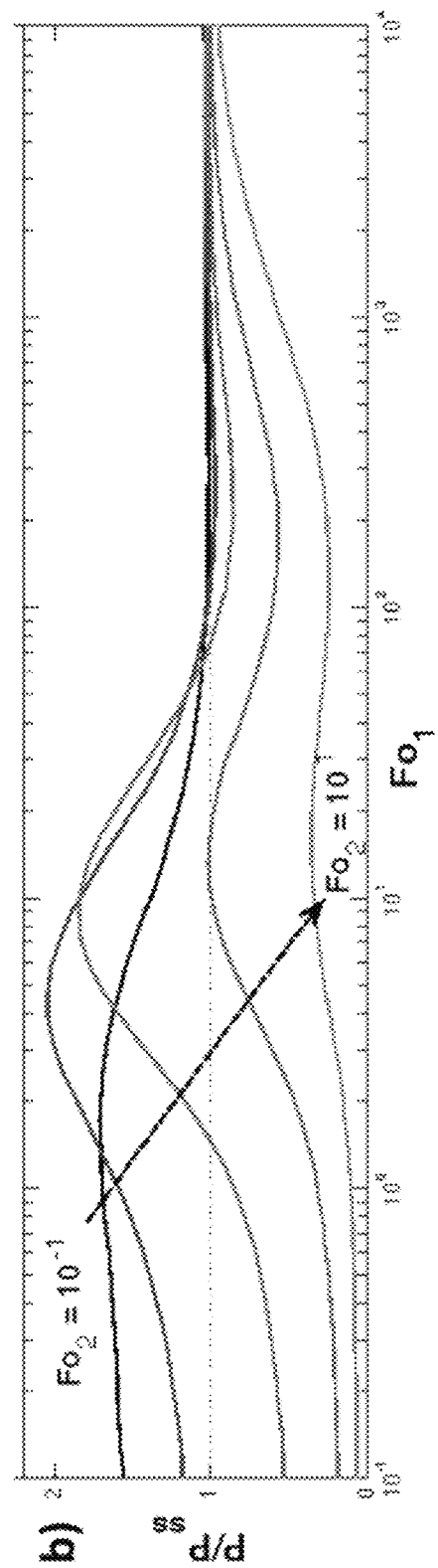

The equations are solved recursively, with the initial condition for the closed phase equal to the final condition for the open phase and vice versa. FIG. 5a shows the theoretical efficiency of a PHF system normalized to that of a steady-state harvester operating with the same $T_{max}/T_\infty=1.5$ and $R^*=0.1$, for a variety of the characteristic time scales $Fo_1$ and $Fo_2$. Here $R^*=C^*=0.1$ and α=1. FIG. 5b shows the theoretical output power P of the PHF model for the same conditions. In each of these simulations, the heat flux Q was set so that the maximum temperature $T_{max}=1.5\, T_\infty$, so that the analysis applied to real systems with finite maximum hot-side temperatures. $Fo_1$ and $Fo_2$ represent characteristic heat transfer time scales for the heat source and sink, respectively, and vary based on the period and duty cycle of the thermal switch.

The model indicates that increasing $Fo_2$ always improves energy conversion efficiency by ensuring that the heat sink has cooled towards $T_\infty$ at the start of each energy conversion cycle. For improved output power, however, the trend is reversed, and shorter $Fo_2$ is preferred. Both power and efficiency increase with increasing $Fo_1$ until $Fo_1 \approx 1$, at which point both decay to the steady state value. The inset of FIG. 5a shows that the phase lag, defined as the delay in radians between the minimum values of $T_s$ and $T_R$, are maximized at low $Fo_1$. However, in this region both power and efficiency are low as a result of lower time-averaged $T_s$. The optimum for both power and efficiency is at an intermediate $Fo_1$, where $T_s$ is close to $T_{max}$ for most of the energy conversion phase, and the phase lag is relatively small. The inflection point for both power and efficiency occurs when the product $Fo_1 R^* C^*$, which is associated with the time constant to warm the heat sink, is approximately one.

Figure 6:
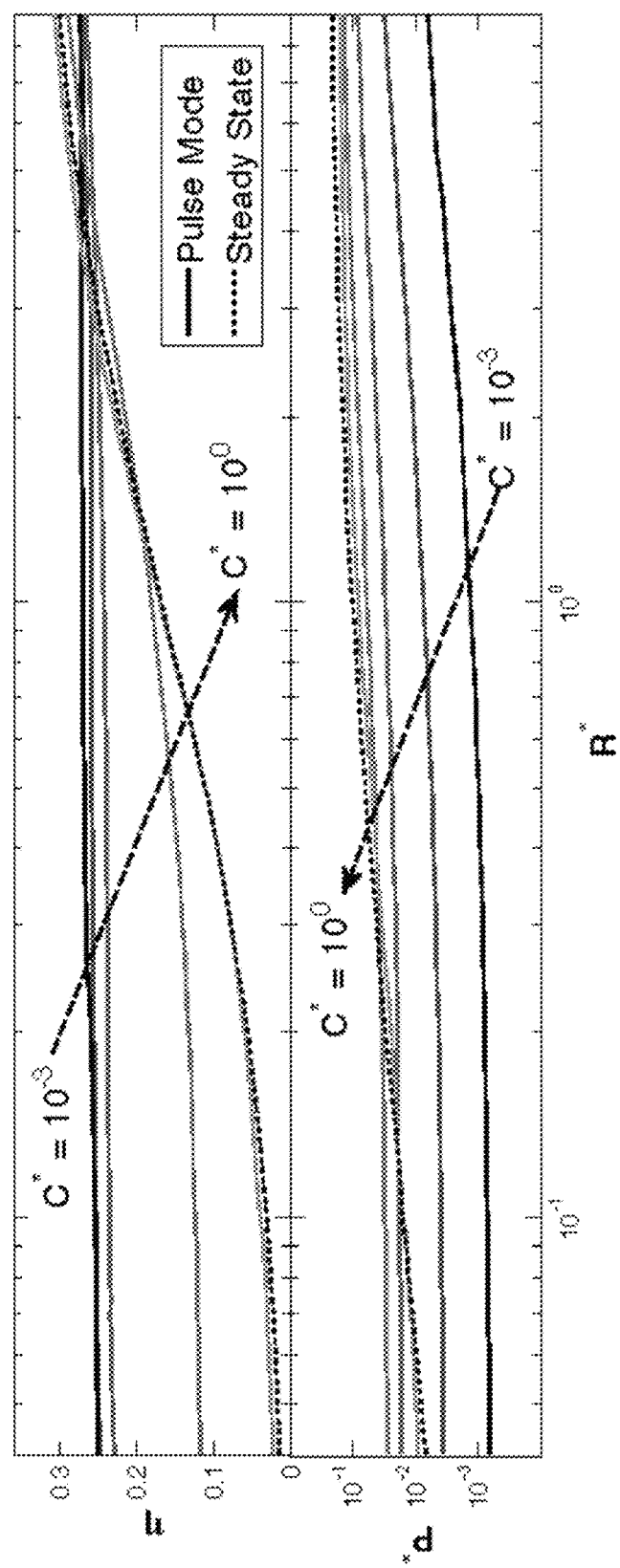
FIG. 6 shows comparison of the power (bottom) and efficiency (top) of the pulse and steady-state energy conversion regimes for the same hot and cold side temperatures; the traces cover a range of engine-sink resistance ratios $R^*$ and $C^*$, for intermediate values of the time scales $Fo_1=5$, $Fo_2=1$.

FIG. 6 compares the efficiency and non-dimensional power $P^*=P(R_S+R_R)/T_\infty$ of the PHF and steady-state strategies at the same maximum temperature difference $T_{max}/T_\infty$ for a variety of R* and C. In this figure, $Fo_1=5$ and $Fo_2=1$, these are near the optimal values for low $R^*C^*$ suggested in FIG. 5. Clearly, suitable values of these time scales can allow the PHF exceed the steady state efficiency for almost any system configuration, with over a 50% advantage over steady state η at $R^*=1$. However, the PHF can only achieve higher power than steady state for systems with low $R^*C^*$. The power and efficiency boost by $R^*=0.1$ can exceed 150%, as shown in FIG. 5.

One Example of the PHF Model: Pulsed Temperature Input

An important special case of the PHF model occurs when $Fo_1<<1$, $C^*<<1$ and the heat flux Q is delivered as sharply declining pulse, as shown in FIG. 7. This case corresponds to a square-wave input on the hot side temperature $T_S$. With $T_S$ specified, the governing equations can be written for $T_R$ alone:

$$\left.\frac{dT_R}{dt}\right|_{closed} = (1 - <\eta_E>)\frac{T_{max} - T_R(t)}{T_E m_R c_R} - \frac{T_R(t) - T_\infty}{R_R m_R c_R} \quad (4)$$

$$\left(<\eta_E> = \frac{\int_0^{t_c} \alpha(1 - T_R(t)/T_{max})\,dt}{t_c}\right)$$

The boundary conditions are the same as (3). Linearizing the heat engine efficiency $\eta_E=\alpha(1-T_R/T_S)$ over the period $t_c$ yields an analytical expression for $T_R$:

$$T_R(t) = \frac{R_E T_\infty + R_R T_{max}(1 - <\eta_E>)}{R_E + R_R(1 - <\eta_E>)} + Ke^{t\frac{(R_E+R_R(1-<\eta_E>))}{m_R c_R R_R R_E}} \quad (5)$$

$$\left(K = \frac{-e^{\frac{t_c}{m_R c_R R_R}} \left(e^{\frac{t_o}{m_R c_R R_R}} - 1\right) R_R (T_\infty - T_{max})(1 - <\eta_E>)}{\left(e^{\frac{t_c + t_o}{m_R c_R R_R}} - e^{\frac{t_c(1 - <\eta_E>)}{m_R c_R R_E}}\right)(R_R + R_R(1 - <\eta_E>))}\right)$$

Figure 7A:
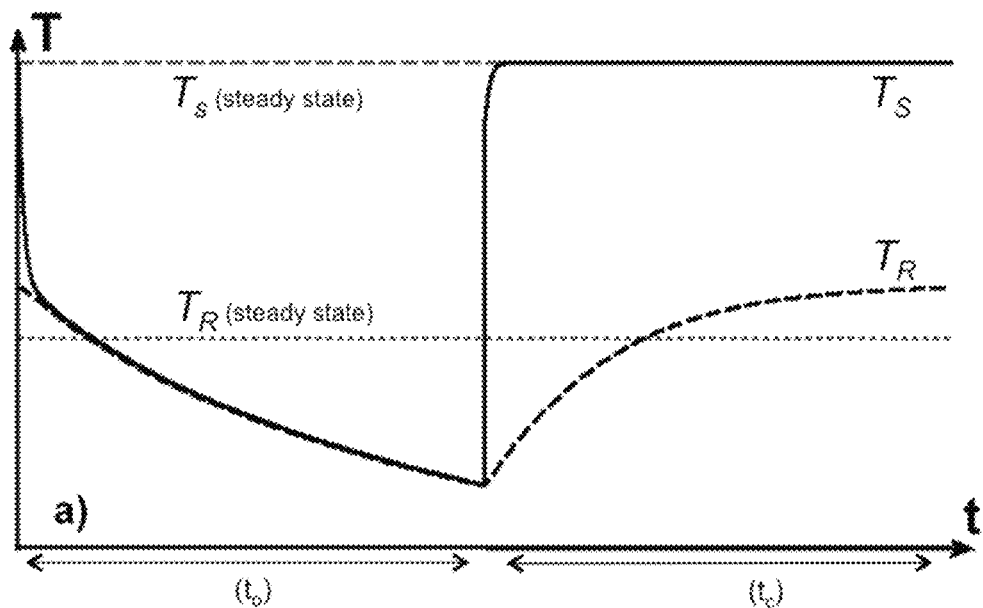
FIG. 7a shows schematic of temperature $T_R$.
Figure 7B:
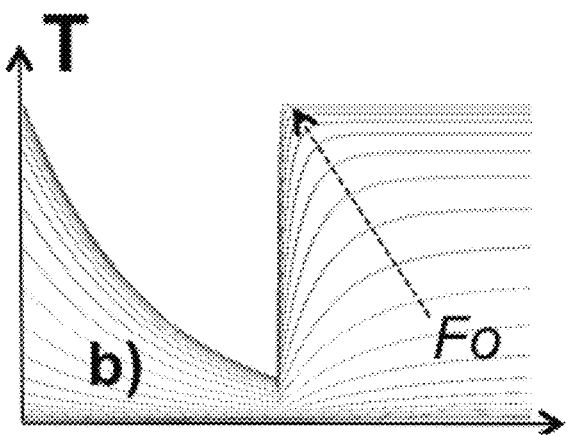
FIG. 7b shows schematic of the variation of $T_R(t)$ with Fo.
Figure 7C:
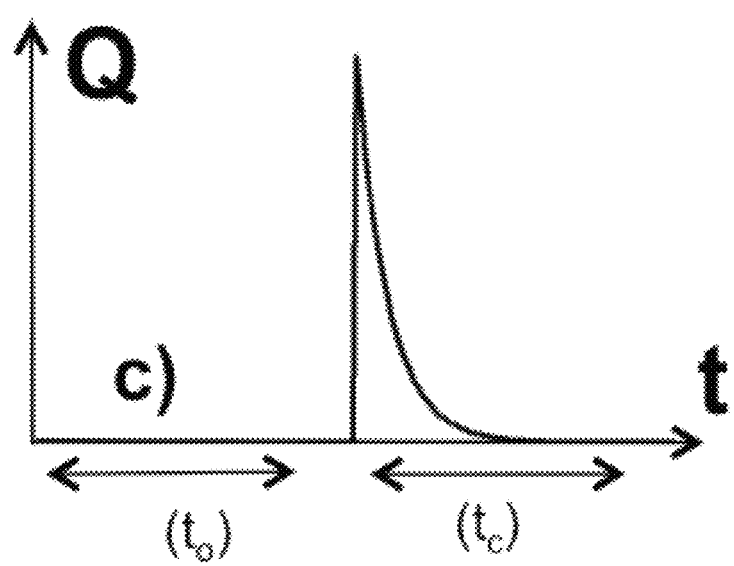
FIG. 7c shows schematic of thermal input power.

FIG. 7 shows schematics of temperature $T_R$ (FIG. 7a), the variation of $T_R(t)$ with Fo (FIG. 7b), and thermal input power (FIG. 7c). All traces are for the special case of small $Fo_1$ and $C^*$ analyzed in this section. Because this model assumes $T_S = T_R$ during the switch-open phase, it ignores any energy conversion occurring during $t_o$, and so can only underestimate the ideal power of the thermal pulse mode for small $m_S c_S$ and $R_E$.

Figure 8A:
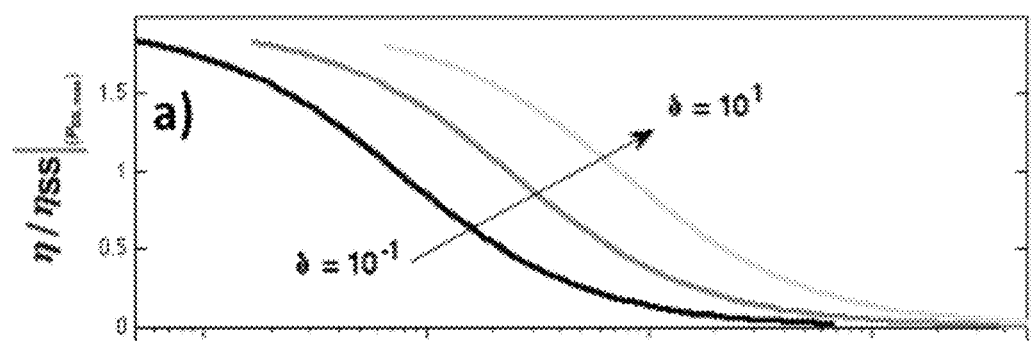
FIGS. 8a and 8c shows the variation in power and FIGS. 8b and 8d shows efficiency of the pulsed mode with the actuation timescale Fo, normalized to the maximum power $(R^*=1)$ steady state performance.
Figure 8B:
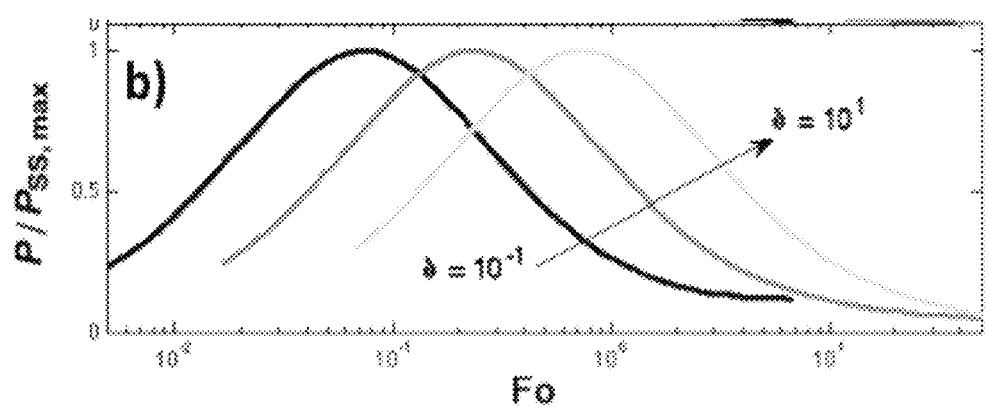
Figure 8C:
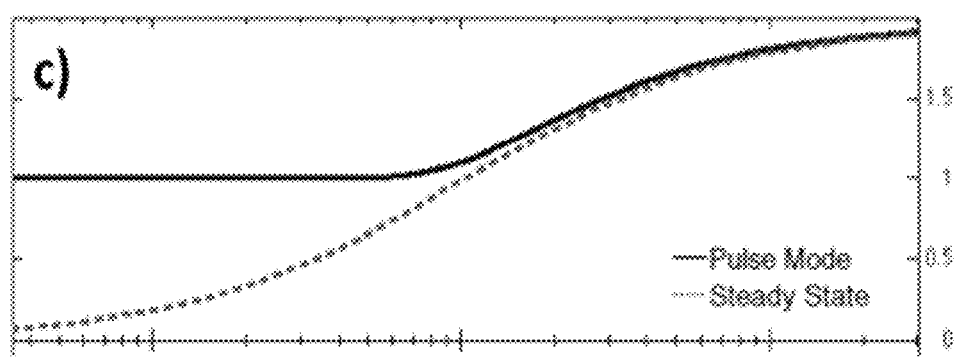
Figure 8D:
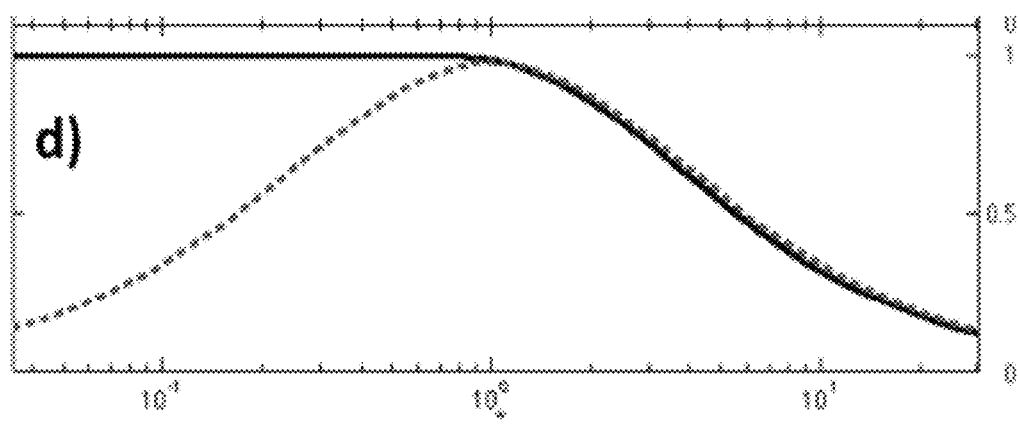

A characteristic timescale of this system is $Fo = t_c(R_E m_R c_R)$. FIG. 8a shows the variation in power, and FIG. 8b shows the variation of efficiency of the pulsed mode with the actuation timescale Fo, normalized to the maximum power ($R^*=1$) steady state performance. At suitable Fo, the pulse mode can match or beat the steady state mode in either power or efficiency, but cannot exceed it in both simultaneously. The power and efficiency of both modes are shown relative $R^*$ in FIG. 8c and FIG. 8d, respectively, again relative the steady state performance in the maximum power condition. As shown in FIG. 8, the pulse temperature input results in similar relationships between the timescales $\delta$ and Fo and the performance $\eta$ and P as the pulse heat flux model. However, FIGS. 8c and 8d clearly show how the square wave temperature input offers better performance than the square wave heat flux input. For optimized $\delta$ and Fo, the pulse mode can equal the maximum-power ($R^*=1$) performance of the steady state mode for any $R^*<1$, and can surpass the steady-state performance in both power and efficiency for all $R^*<1$. This represents an enhancement of approximately 65% in efficiency and 20% in power by $R^*=0.5$, and nearly a four-fold boost in both power and efficiency by $R^*=0.1$.

A Model for Oscillating Thermal Switch (OTS)

Figure 9A:
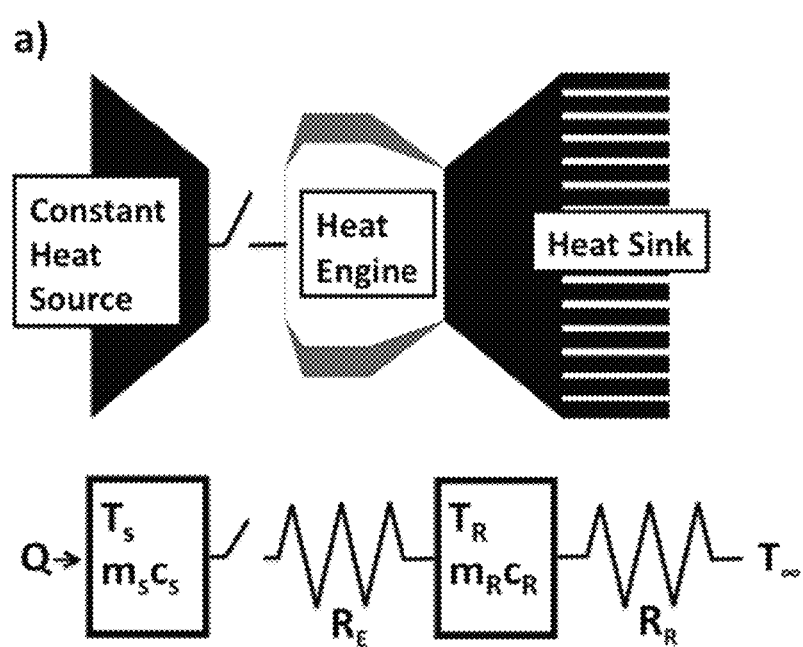
FIG. 9a shows OTS system (top) reduced to a lumped-parameter model (bottom)

A second method to achieve pulsed thermal energy conversion is with an oscillating thermal switch positioned between a constant heat source and a heat engine, as shown schematically in FIG. 9a. The strategy applies to systems with a contained heat source and thermal energy storage capacity, so that energy is not lost to the surroundings during the switch-open phase. The assumptions underlying the OTS model are the same as for the PHF, with the exception of a constant heat source Q and a lossless and discrete thermal switch between the source and engine.

$T_S$ and $T_R$ for the quasi-steady state OTS system can be described both dimensionally and in terms of the scaled temperature $T^*(T-T_{S,min})/(T_{S,max}-T_{S,min})$ and time $t^*=t/t_c$:

$$\left.\frac{dT_S}{dt}\right|_{closed} = \frac{Q}{m_S c_S} - \frac{(T_S - T_R)}{R_E m_S c_S} \quad (6)$$

$$\left.\frac{dT_S^*}{dt^*}\right|_{closed} = \frac{Fo_1}{Fo_2} R^* C^* - Fo_1(T_S^* - T_R^*)$$

$$\left.\frac{dT_R}{dt}\right|_{closed} = (1 - \eta_E)\frac{(T_S - T_R)}{R_E m_R c_R} - \frac{(T_R - T_\infty)}{R_R m_R c_R} \quad (7)$$

$$\left.\frac{dT_R^*}{dt^*}\right|_{closed} = Fo_1 C^*[(1-\eta_E)(T_S^* - T_R^*) - R^*(T_R^* - T_\infty^*)]$$

Figure 9B:
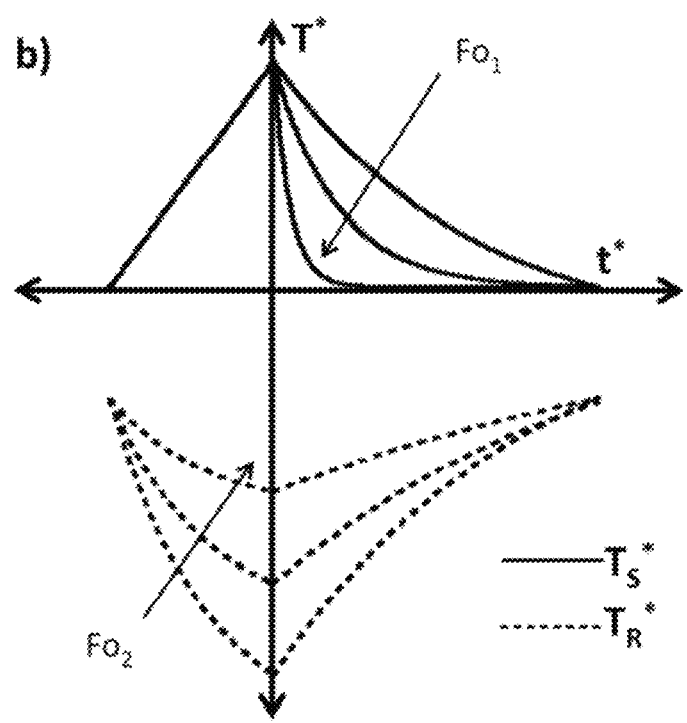
FIG. 9b shows non-dimensional temperature traces of the source and sink for different values of the characteristic time scales $Fo_1$ and $Fo_2$.

FIG. 9b shows schematic traces for $T_S^*$ and $T_R^*$ for different $Fo_1$ and $Fo_2$. The first term in (4) is equivalent to the duty ratio $\delta=t_c/t_o$, while in both (4) and (5) the coefficients of the temperature terms are time constants of the switch-closed phase. The boundary conditions are given by the equations for the switch-open phase, when the heat source warms in isolation and the heat sink cools towards $T_\infty$.

$$\left.\frac{dT_S^*}{dt^*}\right|_{open} = \delta \longrightarrow T_S^*(0) = 1 \quad (8)$$

$$\left.\frac{dT_R^*}{dt^*}\right|_{open} = -Fo_2(T_R^* - T_\infty^*) \longrightarrow T_R^*(0) = T_\infty^* + (T_R^*(-1/\delta) - T_\infty^*)e^{-Fo_2} \quad (9)$$

Figure 10A:
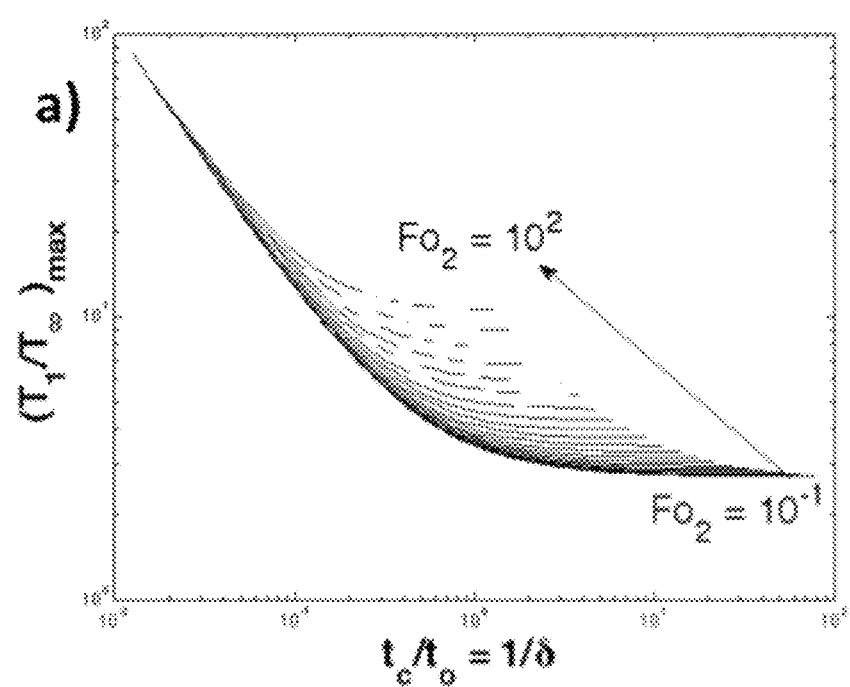
FIG. 10a shows maximum normalized operating temperature as a function of the duty ratio $\delta=t_o/t_c$ and $Fo_2$.
Figure 10B:
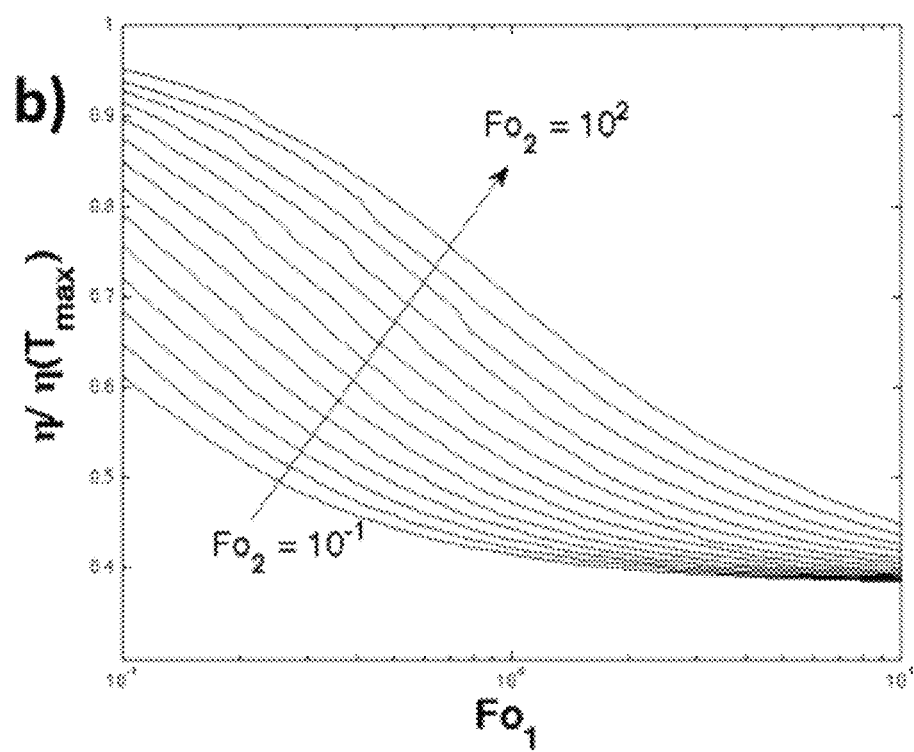
FIG. 10b shows efficiency of the OTS model in terms of the non-dimensional time scales $Fo_1$ and $Fo_2$.

FIG. 10 shows the normalized efficiency and temperature for $C^*=R^*=Q^*=\alpha=1$. FIG. 10a shows that in the absence of a maximum operating temperature, a lower switch duty ratio $\delta$ always leads to a higher temperature ratio $T_S/T_R$, and therefore to more-efficient energy conversion. FIG. 10b shows how the minimization of the characteristic time $Fo_1$ and the maximization of $Fo_2$ increases the theoretical energy conversion efficiency regardless of the maximum temperature reached.

The limit of $Fo_1 \ll 1$ and $\delta$, $Fo_2 \gg 1$ corresponds to an operating condition in which the heat sink cools to $T_\infty$ on every switch-open phase and the source temperature remains nearly constant during each switch-closed phase. The maximum efficiency of the OTS model is expected at the maximum possible value of $Fo_2$ and the minimum value of $Fo_1$, where $\delta$ is set to keep $T_{S,max}$ as close as possible to the temperature tolerance of the system.

One Example of the OTS Model: Constant Heat Sink Temperature

Since many energy harvesters are attached to vehicles or other sinks of comparatively large thermal mass, a case where $C^* \approx 0$ and the heat sink temperature is practically constant may be realistic. The $C^* \approx 0$ condition could also reflect the thermal arrest that would result from incorporating a phase change material heat sink. In this case, $T_R = T_\infty + R_R Q$, and the characteristic time scale of the system reduces to $Fo_1$ alone. This model has a closed-form solution for the energy-conversion temperature gradient $T_S/T_R$:

$$\frac{T_S}{T_R} = 1 + \frac{Q}{T_R}\left(R_E + \frac{t_o}{m_s c_s} \frac{e^{\frac{t_c-t}{R_E m_s c_s}}}{e^{\frac{t_c}{R_E m_s c_s}} - 1}\right) \quad (10)$$

For the maximum efficiency case of $\delta \gg 1$, $Fo_1 \ll 1$, the temperature simplifies to $T_S/T_\infty = 1 + Q^*(\delta+1)$, and the conversion efficiency is given by $\alpha Q^*/(D+Q^*)$ for duty cycle $D=1/(\delta+1)$. Because both the source and sink temperatures are effectively constant during the switch-closed phase with $Fo_1 \ll 1$, the temperature gradient reflects the effective thermal resistance of a rapidly switched connection with resistance Rsw etween two infinite thermal reservoirs: $R_{Eff} = R_{sw}/D$. For a $C^* \approx 0$ system operating in these conditions, the maximum temperature $T_{max}$ corresponds to the duty cycle $D = Q^*/(T_{max}/T_\infty - 1)$.

Potential Application of Pulsed Thermal Energy

New methods of enhancing thermal energy conversion with pulsed heat transfer are developed. In the transient regime, an available temperature difference can be more effectively concentrated across a heat engine, rather than split between the heat engine and a heat sink. If controlled properly, this effect can be exploited to increase both the efficiency and power density of systems that operate with a low engine-heat sink resistance ratio R*. The enhancement increases at lower R*, where traditional conversion strategies break down. The theoretical efficiency improvement for a system with R*=1 could exceed 80% with reduced output power, while the improvement for an R*=0.5 system could exceed 60% in power and 15% efficiency, without any increase in the system hot-side temperature. The maximum efficiency of the pulsed heat flux model occurs at the maximum possible value of the time scale $Fo_2$, low Fo, and the duty cycle D that keeps $T_S$ as near as possible to the maximum temperature. The maximum power is also reached at low $Fo_1$, but at more intermediate $Fo_2$ and higher D. The high and variable thermal impedance of the periodic thermal connection may be particularly useful for systems that work at small scales or with time-varying heat production. Future work may include an expanded treatment of the governing equations tailored towards a specific type of thermal energy harvester, or an analysis of suitable methods of inducing pulsed heat transfer from a constant heat source.

Two models of thermal pulse energy conversion, one based on a periodic heat flux (PHF) and another based on a periodic connection to a constant heat source (OTS), are developed. Additionally, two important sub-cases are investigated, representing thermal switching to constant hot- and cold-side temperatures, respectively. For a fixed system resistance $R_R+R_E$ and temperature bounds $T_{max}$ and $T_\infty$, the OTS strategy is ideally suited to increase the energy conversion efficiency at low power across a range of R*, and its high and variable thermal impedance could also help small systems maintain a higher hot-side temperature than is typically possible. In contrast, the PHF strategy is capable of increasing both efficiency and power, though the combination of the two cannot exceed the steady-state maximum. While the behaviors of the PHF and OTS systems differ, in both cases the energy conversion enhancement is attributable to effective adjustment in $R_E$ with changing D.

The best performance is expected from a system with a pulsed hot-side temperature input (Section: One example of the PHF model: Pulsed Temperature Input). For a system limited by heat rejection capacity, this strategy theoretically allows an energy harvester work at the system maximum power point (ordinarily possible only at R*=1) at any R*. Just as the OTS, it also enables the system to approach the maximum possible efficiency $\eta_E=\alpha(1-T_\infty/T_{max})$ at any R*, although at a lower power.

These attributes could allow for better performance and design flexibility for systems otherwise compromised by unfavorable R*. Such systems include very small-scale energy harvesters, in which $R_E$ cannot be elevated enough to compensate for low heat rejection ability. Energy harvesters that process time-variant heat fluxes could also be enhanced; for these systems, an adjustment in D to match the incident flux would constitute a new type of thermal maximum power point tracking.

Figure 11A:
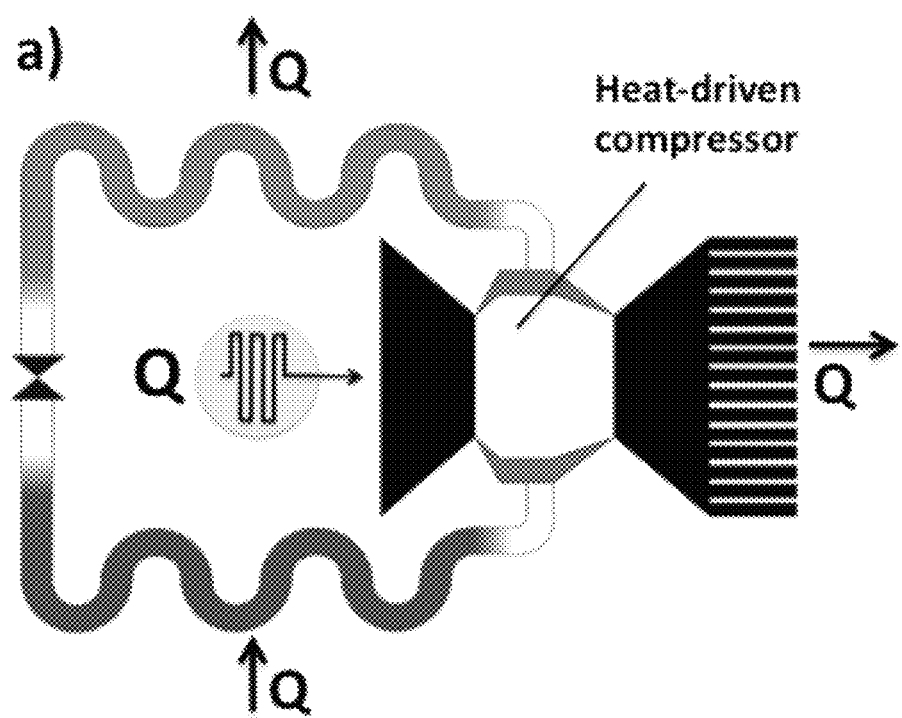
FIG. 11a shows example application of thermal pulse energy conversion in a gas-fired chiller.
Figure 11B:
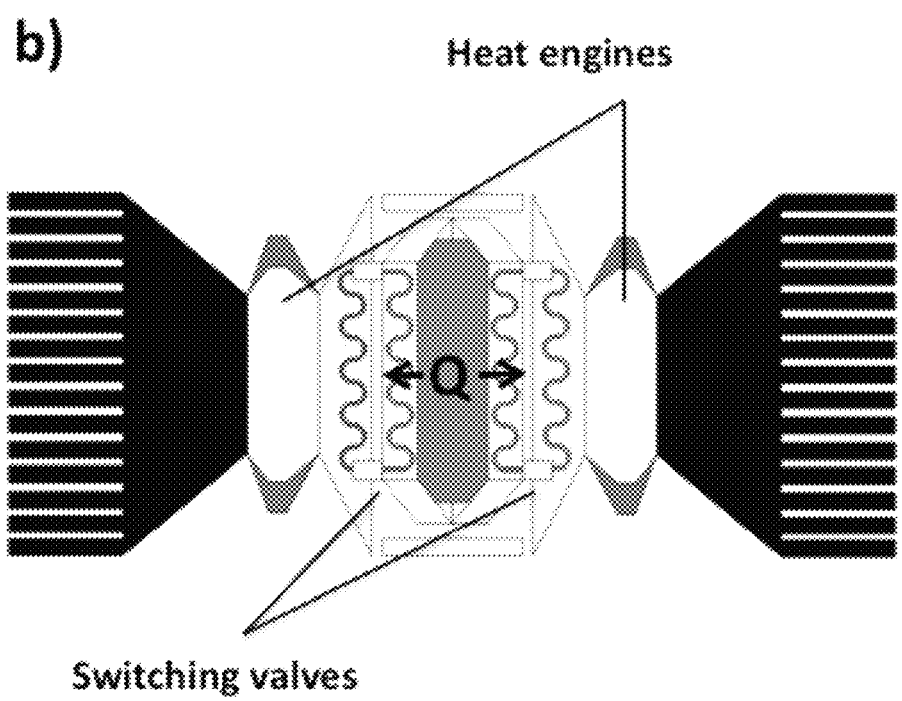
FIG. 11b shows the thermal pulse strategy in an energy harvester that uses a constant heat source, such as a Radioisotope Power System (RPS).

While the thermal pulse mode may be best-suited to small-scale energy harvesters, the application to more traditional systems is also of interest. FIG. 11 shows generalized schematics of two such systems. The gas-fired chiller in FIG. 11a represents a direct application of the PHF model. FIG. 11b depicts a general energy converter, such as a solar-thermal power plant using a PHF strategy. FIG. 11b shows the thermal pulse strategy in an energy harvester that uses a constant heat source, such as an RPS. This system could run with a single heat engine if the switch were instead used to cycle coolant between two heat sinks. By cycling heat transfer fluid between two engine-heat sink pairs, the system could benefit from the efficiency boost of the PHF without the power loss even at higher R*. In a variant of FIG. 11b, the PHF might also be implemented with a naturally oscillatory conversion process, such as in pyroelectric or thermochemical converters. See, for example, Kandasamy R. et al., *Applied thermal engineering* 2008, 28, 1047-57; and Vining C. et al., *J. Electrochem. Soc.* 1993, 140, 2760-63, each of which is incorporated by reference in its entirety. In FIG. 11a, the periodic heat transfer is induced by switching the combustor on and off. In FIG. 11b, the periodic heat transfer could be induced with a switching valve, or with one of the passively bistable thermal-fluid circuits described in Hall, W., *Handbook of thermoelectrics CRC Press* 1995, 503. Promising future work might include an analysis of the thermal pulse mode in the context of one of these oscillatory conversion processes.

Figure 12:
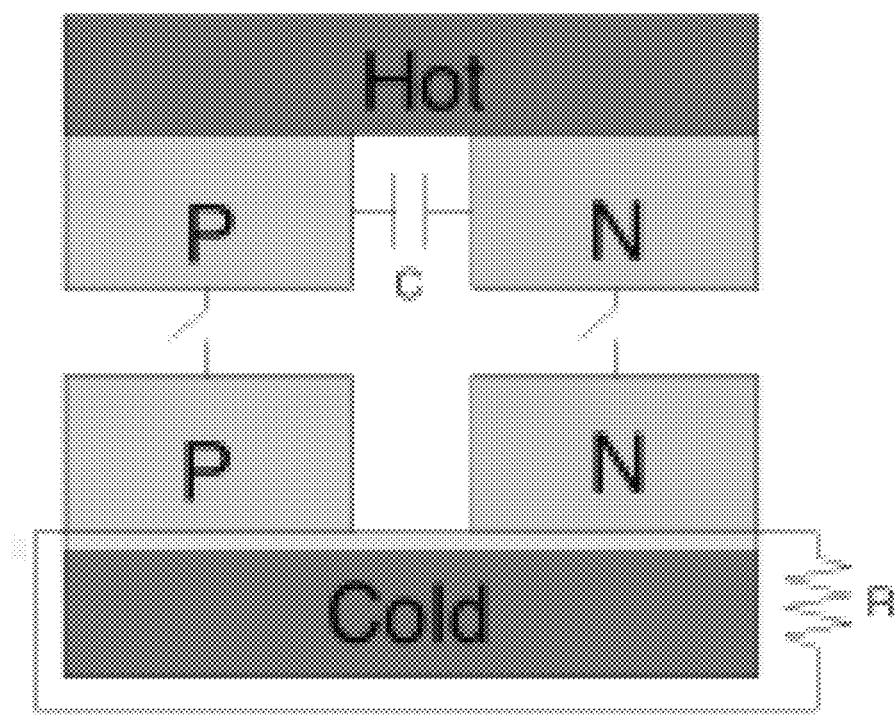
FIG. 12 depicts a thermoelectric generator.

FIG. 12 depicts a thermoelectric generator. OTS can be used in phonon-electron sorting in thermoelectrics based on differential scattering time across switch material. OTS allows inflated thermal impedance with no electrical dissipation. In addition, a thermal energy harvester system with pulsed heat can be used as maximum power point tracking, and such system can keep efficiency high even when the energy harvester and incident heat flux are not perfectly matched.

Thermal transient processes already drive a number of high-efficiency heat removal systems, including pulsating heat pipes, solid-state heat pumps, and phase change electronics cooling. See, for example, U.S. Pat. No. 4,921,041; Snyder G. et al., *Journal of applied physics* 2002, 92, 1564-69; and Kandasamy R. et al., *Applied thermal engineering* 2008, 28, 1047-57, each of which is incorporated by reference in its entirety. However, outside of work on pyroelectric and other solid-state phenomena, little attention has been given to the potential benefit of the thermal pulse mode in an energy harvesting context. See, for example, Hunter N. et al., *Proc. of SPIE* 2011, 8035, 80350V; and Choi W. et al., *Nature Materials* 2010, 9, 423-29, each of which is incorporated by reference in its entirety. Here, both the PHF and OTS energy harvesting configurations are investigated. A quasi-steady-state model of the pulsed heat flux system is developed. A similar model of the OTS (FIG. 2b) is also developed and validated with proof-of-concept experiments. There are potential opportunities in using thermal pulse energy conversion for increased efficiency and power output in applications ranging from remote power generation to waste heat recovery.

EXAMPLES

Example Implementation

Figure 13:
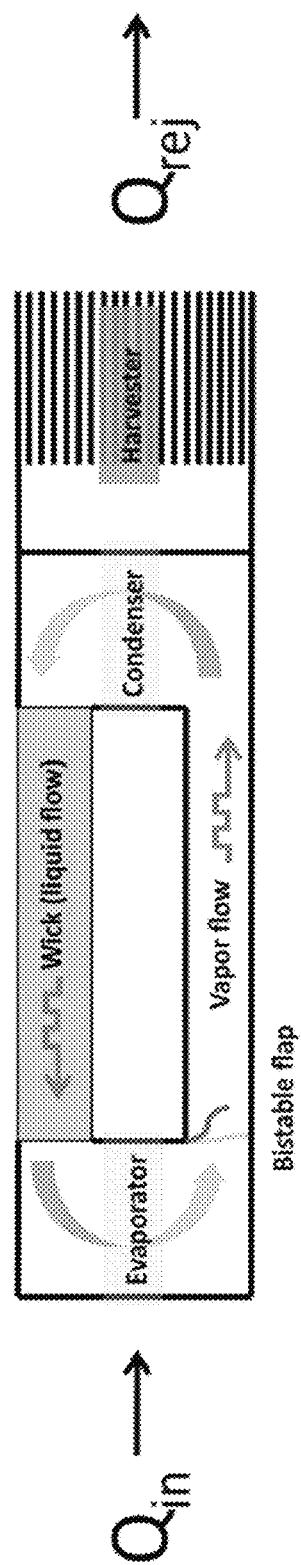
FIG. 13 shows one implementation of thermal pulse energy harvesting.

In one implementation of the thermal pulse energy harvesting strategy, a heat pipe could incorporate a pliant flap between its evaporator and condenser. As shown in FIG. 13, this flap only opens to allow vapor flow when the vapor pressure exceeds a critical pressure corresponding to a certain temperature $T_{hot}$ at evaporator. Vapor inertia and/or a passive mechanical latching system render the system bistable; heat is transferred in short bursts whenever the hot side has reached $T_{hot}$; no heat is transferred to the engine otherwise. This results in an approximately square wave thermal pulse delivered over an energy harvester. The characteristics of the rubber flap are calibrated so that the temperature of the thermal energy delivered is the maximum allowed for the heat engine. As a result, the heat engine operates at its peak efficiency no matter the magnitude of the incoming heat flux Q.

As shown in FIG. 13, a device that generates pulsed heat can comprise an evaporator region, a condenser connected by a liquid conduit and a vapor conduit to the evaporator region to form a circuit, and a flap in the circuit, wherein the flap opens to allow vapor flow from the evaporator to the condenser when pressure exceeds a critical pressure corresponding to a predetermined temperature of the evaporator. The evaporator can be configured to receive heat energy from a heat source and the condenser can be adjacent to an energy harvester configured to withdraw heat energy from the condenser. The liquid conduit can include a wicking material. A wicking material can be a material that conveys liquid by capillary action.

This particular implementation provides information that complements the data already collected with the externally-actuated mechanical apparatus described herein. The manufacturers of various energy harvesting and climate control systems can readily adapt the system to fit a variety of thermal energy applications.

Experimental Validation

Proof-of-concept experiments were conducted to both validate the model and investigate the potential of the OTS strategy. In one set of experiments, a $C^*=0$ test apparatus was used to validate equation (8) and the maximum efficiency case over a range of Fo. In a second set of experiments, an OTS system at favorable $Fo_1$ and $Fo_2$ was compared to an equivalent steady-state system for a variety of $R^*$ and $C^*$, while limiting both systems to the same maximum temperature.

Figure 14A:
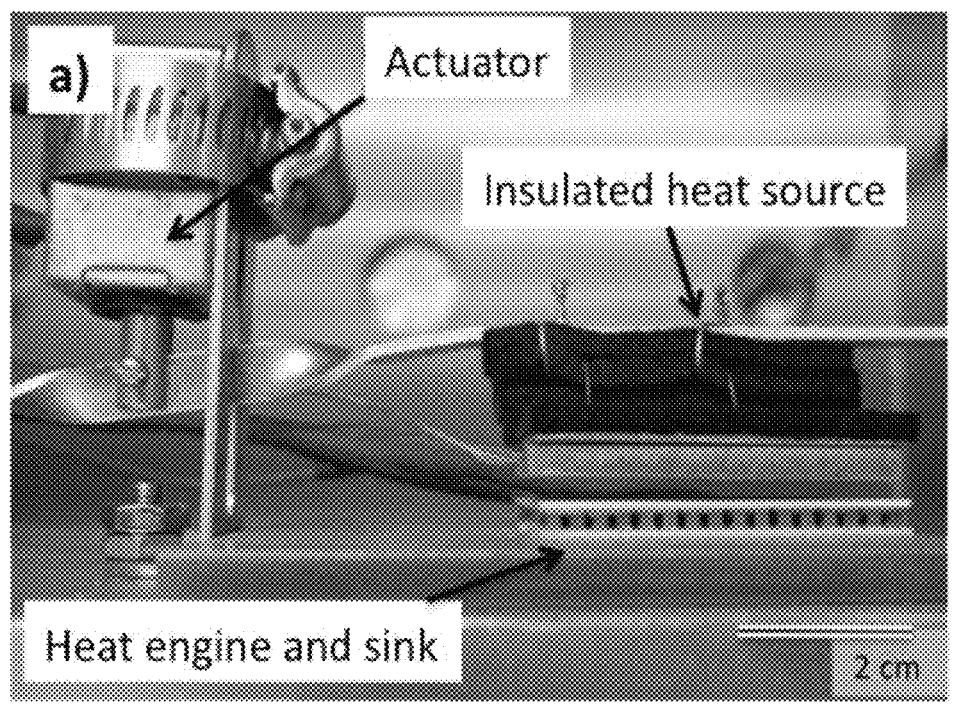
FIG. 14a shows proof-of concept experiment in a vacuum chamber.

As shown in FIG. 14a, an externally-powered latching solenoid (Shenzhen Appliances ZHO-1253) was used to physically move a heated block into and out of contact with either a thermoelectric generator (Marlowe TG-12) connected to a large heat sink for the $C^*=0$ case shown, or with a simulated heat engine-heat sink combination (for the general case). A compliant graphite-polymer interface (Panasonic PGS) was used to ensure identical contact resistance for both the steady-state and OTS tests. The tests were conducted in a vacuum chamber at a pressure under 500 Pa to minimize convective heat loss. In both cases, the temperatures $T_S$ and $T_R$ were measured using a J-type thermocouple and used to infer the energy conversion potential of the simulated heat engine; the thermoelectric generator was left in an open-circuit condition to ensure constant thermal resistance, preserving the generality of the results.

Experiment Under Constant Heat Sink Temperature

For the constant heat sink temperature case, the duty cycle of the connection was calibrated to keep the maximum temperature of the heat source constant at $T_{max}/T_\infty=1.25$ during steady oscillation. This experiment confirmed the interdependence of $Fo_1$ and $\eta$, for the case where $\alpha=1$, $C^*=0$ and $Q^*=0.01$ from the model. The theoretical maximum efficiency was calculated from the average of $\eta_{Carnot}$ over the heat flux.

Figure 14B:
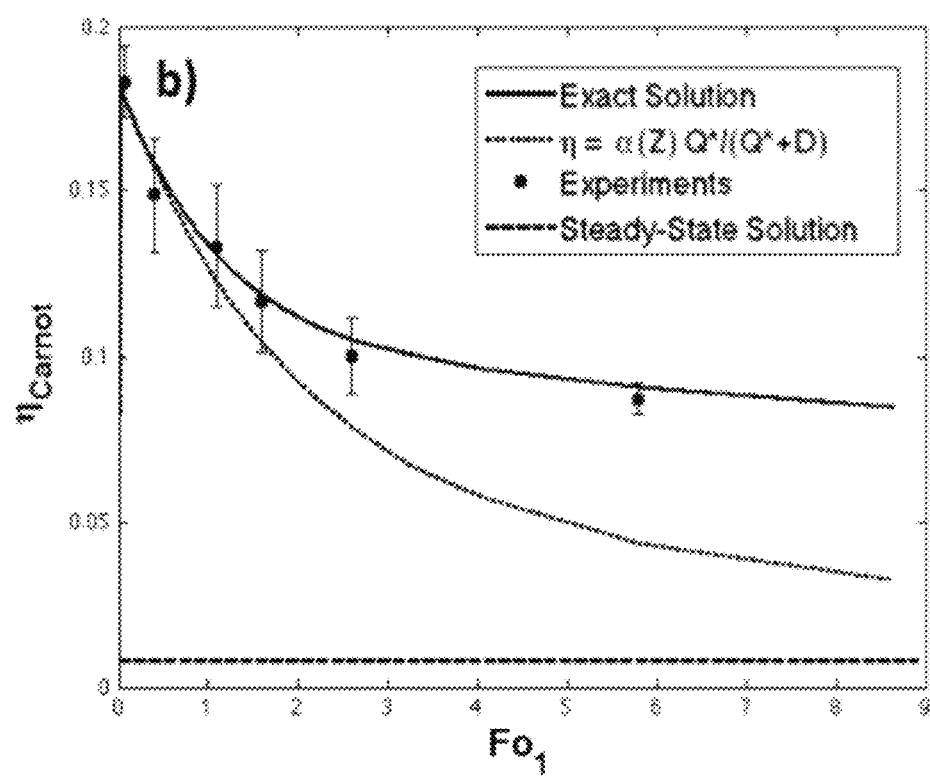
FIG. 14b shows average energy conversion efficiency $\eta_{Carnot}$ based on experimental temperature measurements for the oscillating switch system ($\alpha=1$, $C^*=0$, $Q^*=0.01$).

FIG. 14a shows that proof-of concept experiment was conducted in a vacuum chamber. FIG. 14b shows average energy conversion efficiency $\eta_{Carnot}$ based on experimental temperature measurements for the oscillating switch system ($\alpha=1$, $C^*=0$, $Q^*=0.01$), showing the convergence to the approximate conversion efficiency $\eta=\alpha Q^*/(D+Q^*)$ when $Fo_1 \ll 1$. In the thermal pulse tests, D was set to maintain $T_{max}/T_\infty=1.25$.

FIG. 14b shows the experimental results compared with both the exact solution and the approximation $\eta=\alpha Q^*/(D+Q^*)$. As shown, the exact solution is in good agreement with the actual performance. The small discrepancy is likely due to a combination of imperfect thermal isolation of the simulated heat source, parasitic contact resistance on the hot-side compliant thermal interface, finite thermal gradients inside the heat sink, and unaccounted-for effects of the thermal energy storage in the simulated heat engine, which would bring the solution closer to the D=1 behavior. The error bars are associated with the standard deviation in calculated $\eta$ between successive energy conversion periods, and which can be attributed to the imperfect components used to set $t_c$ and $t_o$.

Experiment Using a General Oscillating Thermal Switch

This test evaluated the OTS strategy for a system with a real heat sink, $C^* \neq 0$, for a variety of $R^*$. The demonstration of FIG. 14a was modified to include two thermal resistors and a copper block in place of the thermoelectric generator, emulating the engine resistance $R_E$, heat sink resistance $R_R$, and heat sink thermal mass $m_S c_S$, respectively. The test apparatus was painted black to enable quantitative temperature measurement with an infrared camera (measured temperatures were verified with a J-type thermocouple). The actuation time scales were set to the near-optimal $Fo_1=0.1$ and $Fo_2=10$, and the heat flux Q set such that the maximum temperature ratio $T_{max}/T_\infty$ did not exceed 1.5 at any point in the actuation cycle. Monitoring both $T_S$ and $T_R$, the steady-state and OTS performance were compared for a variety of $R^*$ and C. FIG. 15 shows an infrared image the modified apparatus, highlighting the higher average energy conversion temperature gradient of the OTS strategy relative to the steady-state strategy. FIG. 16 shows the variation in $\eta$ with $R^*$ in this test, highlighting the ability of the OTS system to maintain near-optimal efficiency for a range of system configurations.

Figure 15A:
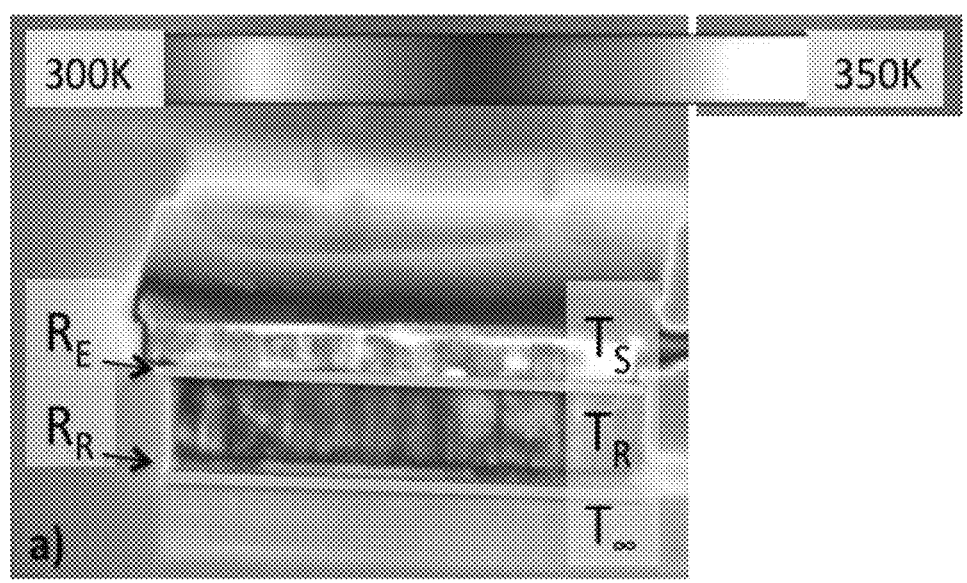
FIGS. 15a and 15b represent a series of infrared image of a modified test system.
Figure 15B:
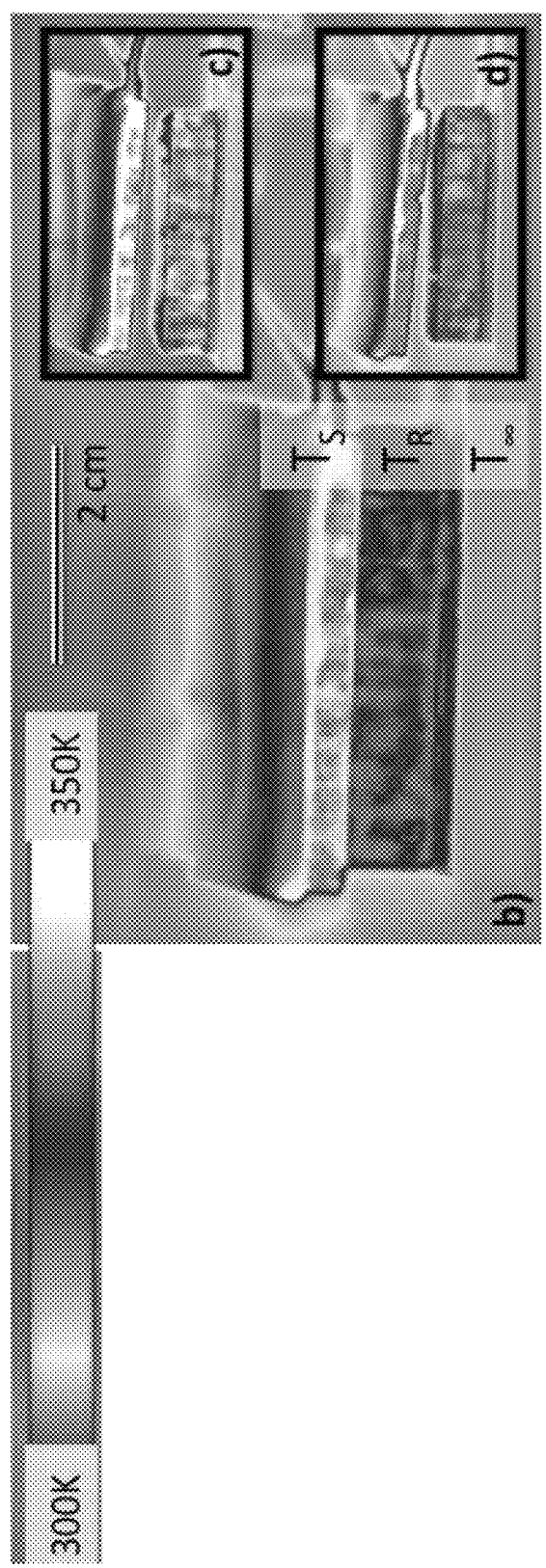
Figure 16:
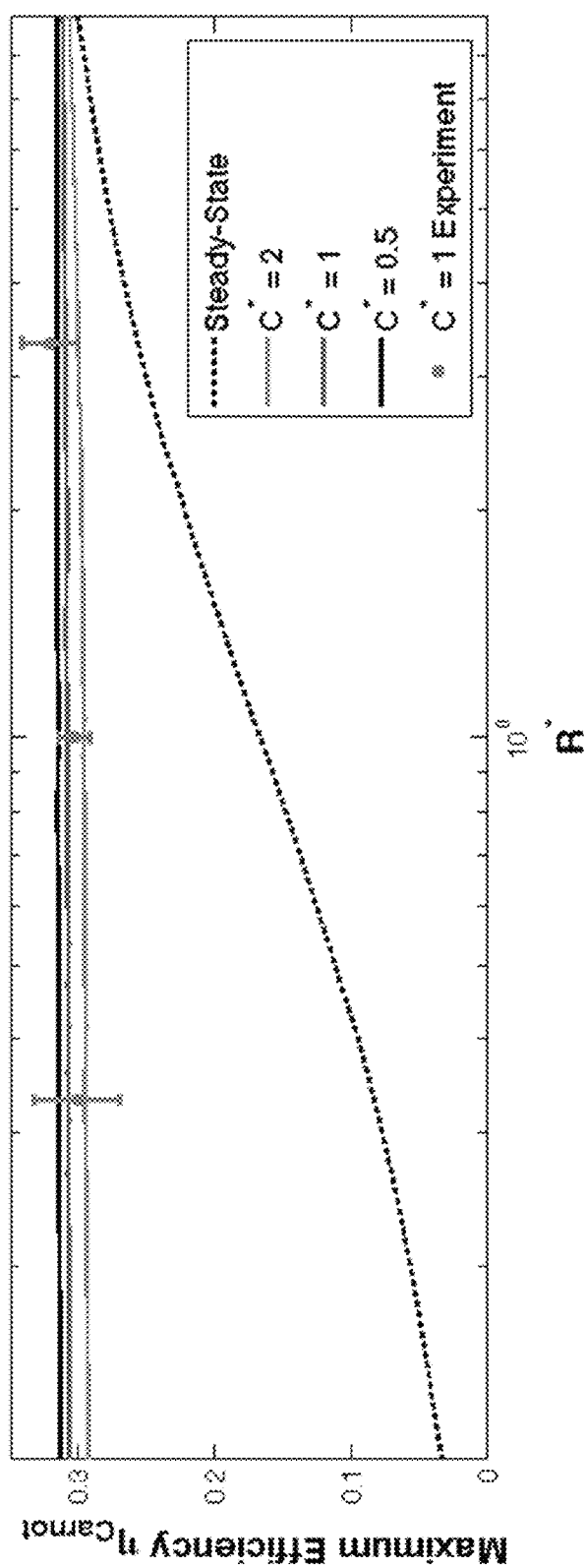
FIG. 16 shows performance comparison between the OTS and steady-state energy harvesting strategies for a variety of $C^*$ and $R^*$, all held to $T_{max}/T_\infty=1.5$ and working at quasi-optimal $Fo_1=0.1$, $Fo_2=10$.

FIG. 15 is a series of infrared image of the modified test system, showing the two inert thermal resistors placed between the source, heat sink, and ambient blocks. FIG. 15a shows the thermal gradient during the middle of the switch-closed phase of the OTS cycle thermal gradient for $C^*=0.5$, $R^*=1$ and $T_{max}/T_\infty=1.15$; FIG. 15b shows the steady-state temperature profile for the same conditions. The inset shows the OTS system an instant before (c) and an instant after (d) the switch-closed period.

FIG. 16 shows performance comparison between the OTS and steady-state energy harvesting strategies for a variety of $C^*$ and $R^*$, all held to $T_{max}/T_\infty=1.5$ and working at quasi-optimal $Fo_1=0.1$, $Fo_2=10$. The experimental results are for a $C^*=1$ system similar to that in FIG. 15.

FIG. 16 confirms that the OTS strategy has considerable efficiency advantages over steady-state heat flow over a range of $R^*$. However, these advantages should be understood in context of the lower power of the OTS system. Due to the higher effective thermal resistance of the OTS connection, an OTS system with a given maximum hot-side temperature must process a lower time-averaged heat flux than an identical system without a thermal switch. For the PHF model, this effect can be overcome by running the system at lower $R^*$ and delivering heat in short bursts, enabling high power operation. In contrast, the maximum heat flux over the engine in the OTS model is coupled to the heat source temperature $T_S$. As a result, given a maximum hot-side temperature, the OTS can improve energy conversion efficiency over an optimized steady-state strategy, but at the expense of lower specific power.

Figure 17:
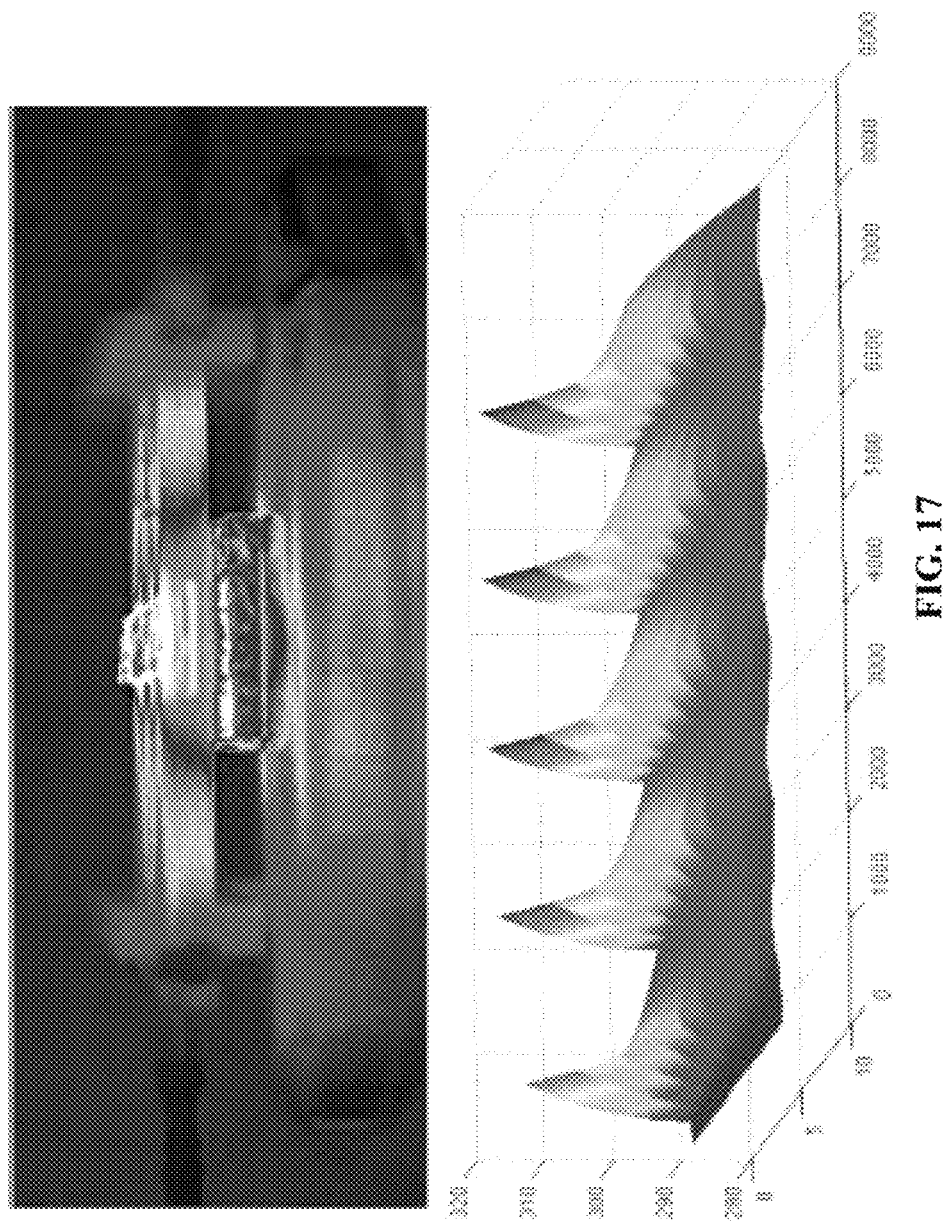
FIG. 17 shows a liquid metal thermal switch and the resulting thermal waves.

An OTS can be a liquid metal thermal switch. FIG. 17 shows a 0-5 Hz liquid metal thermal switch and finite element simulation of the resulting thermal waves.

Other embodiments are within the scope of the following claims.

What is claimed is:

1. A device for thermal energy harvesting comprising:
   a heat source that generates pulsed heat, wherein the pulsed heat is periodic, intermittent or oscillating;
   a heat engine thermally connected to the heat source by a first thermal conduit; and
   a heat sink thermally connected to the heat engine by a second thermal conduit,
   wherein the first thermal conduit and the second thermal conduit are distinct;
      wherein the heat source configures to achieve pulsed heat transfer across the heat engine;
      wherein the heat engine converts the pulsed heat; and
      wherein the heat sink dissipates heat.

2. The device of claim 1, wherein the pulsed heat is produced by a pulsed heat flux from the heat source.

3. The device of claim 2, wherein the pulsed heat flux includes a system that produces periodic heat.

4. The device of claim 3, wherein the system includes a periodically burning gas heater.

5. The device of claim 2, wherein the pulsed heat flux includes an intermittently flowing heat transfer fluid.

6. The device of claim 2, wherein the pulsed heat flux includes an oscillating heat flux.

7. The device of claim 2, wherein when the pulsed heat flux is on, the rate of temperature change for the heat source varies.

8. The device of claim 7, wherein when the pulsed heat flux is on, the rate of temperature change for the heat source is defined as:

$$\left.\frac{dT_S}{dt}\right|_{closed} = \frac{Q}{m_s c_s} - \frac{(T_S - T_R)}{R_E m_s c_s}$$

wherein closed means that the pulsed heat flux is on, Q is input power, $m_s$ is mass of the heat source, $c_s$ is specific heat of the heat source, $T_S$ is the temperature of the heat source, $T_R$ is the temperature of the heat sink, and $R_E$ is the thermal resistance of the heat engine.

9. The device of claim 2, wherein when the pulsed heat flux is off, the rate of temperature change for the heat source varies.

10. The device of claim 9, wherein when the pulsed heat flux is off, the rate of temperature change for the heat source is defined as:

$$\left.\frac{dT_S}{dt}\right|_{open} = \frac{(T_S - T_R)}{R_E m_s c_s}$$

wherein open means that the pulsed heat flux is off, $T_S$ is the temperature of the heat source, $T_R$ is the temperature of the heat sink, $R_E$ is the thermal resistance of the heat engine, $m_s$ is the mass of the heat source, and $C_s$ is the specific heat of the heat source.

11. The device of claim 2, wherein the rate of temperature change for the heat sink varies.

12. The device of claim 11, wherein the rate of temperature change for the heat sink is defined as:

$$\left.\frac{dT_R}{dt}\right|_{open/closed} = (1 - \eta_E)\frac{(T_S - T_R)}{R_E m_R c_R} - \frac{(T_R - T_\infty)}{R_R m_R c_R}$$

wherein open means that the pulsed heat flux is off, closed means that the pulsed heat flux is on, $\eta_E$ is heat engine efficiency, $T_S$ is the temperature of the heat source, $T_R$ is the temperature of the heat sink, $R_E$ is the thermal resistance of the heat engine, $m_R$ is the mass of the heat sink, $c_R$ is the specific heat of the heat source, $T_\infty$ is ambient temperature, and $R_R$ is the thermal resistances between the heat sink and ambient.

13. The device of claim 2, wherein increasing the bulk Fourier number of the heat sink improves energy conversion efficiency.

14. The device of claim 2, wherein a smaller bulk Fourier number of the heat sink is preferred to improve output power.

15. The device of claim 2, wherein phase lag is maximized at a low bulk Fourier number of the heat source.

16. The device of claim 2, wherein power and efficiency optimum is at:
   an intermediate bulk Fourier number of the heat source;
   heat source temperature close to maximum temperature; and
   small phase lag.

17. The device of claim 2, wherein both power and efficiency increase with increasing bulk Fourier number of the heat source until the bulk Fourier number of the heat source reaches 1.

18. The device of claim 2, wherein when the bulk Fourier number of the heat source is smaller than 1, energy storage ratio is smaller than 1, the heat flux is delivered as sharply declining pulse, and the heat flux is on, the rate of temperature change for the heat sink varies.

19. The device of claim 2, wherein when the bulk Fourier number of the heat source is smaller than 1, the energy storage ratio is smaller than 1, the heat flux is delivered as sharply declining pulse, and the heat flux is on, the rate of temperature change for the heat sink is defined as:

$$\left.\frac{dT_R}{dt}\right|_{closed} = (1 - <\eta_E>)\frac{T_{max} - T_R(t)}{T_E m_R c_R} - \frac{T_R(t) - T_\infty}{R_R m_R c_R}$$

$$\left(<\eta_E> = \frac{\int_0^{t_c} \alpha(1 - T_R(t)/T_{max})\,dt}{t_c}\right)$$

wherein closed means that the pulsed heat flux is on, $T_R$ is the temperature of the heat sink, $\eta_E$ is heat engine efficiency, $T_{max}$ is maximum temperature, $T_R(t)$ is the temperature of the heat sink at different time, $T_E$ is the temperature of the heat engine, $m_R$ is the mass of the heat sink, $c_R$ is the specific heat of the heat source, $T_\infty$ is ambient temperature, $R_R$ is the thermal resistances between the heat sink and ambient, $t_c$ is time when the heat flux is on, and $\alpha$ is fraction of Carnot efficiency.

20. The device of claim 2, wherein when the bulk Fourier number of the heat source is smaller than 1, the energy storage ratio is smaller than 1, and the heat flux is delivered as sharply declining pulse, the temperature of the heat sink changes with time.

21. The device of claim 20, wherein when the bulk Fourier number of the heat source is smaller than 1, the energy storage ratio is smaller than 1, and the heat flux is delivered as sharply declining pulse, the temperature of the heat sink at different time is defined as:

$$T_R(t) = \frac{R_E T_\infty + R_R T_{max}(1 - <\eta_E>)}{R_E + R_R(1 - <\eta_E>)} + K e^{t\frac{(R_E + R_R(1 - <\eta_E>))}{m_R c_R R_R R_E}}$$

-continued $$K = \frac{-e^{\frac{t_C}{m_R c_R R_R}}\left(e^{\frac{t_O}{m_R c_R R_R}} - 1\right)R_R(T_\infty - T_{max})(1 - <\eta_E>)}{\left(e^{\frac{t_C+t_O}{m_R c_R R_R}} - e^{\frac{t_C(1-<\eta_E>)}{m_R c_R R_E}}\right)(R_R + R_R(1 - <\eta_E>))}$$

wherein $T_R(t)$ is the temperature of the heat sink at different time, $R_E$ is the thermal resistance of the heat engine, $T_\infty$ is ambient temperature, $R_R$ is the thermal resistances between the heat sink and ambient, $T_{max}$ is maximum temperature, $\eta_E$ is heat engine efficiency, e is a constant, $m_R$ is the mass of the heat sink, $c_R$ is the specific heat of the heat source, $t_c$ is time when the heat flux is on, and $t_o$ is time when the heat flux is off.

22. The device of claim 2, wherein when engine-sink thermal resistance ratio is smaller than 1, pulse mode surpasses steady-state performance in both power and efficiency.

23. The device of claim 1, wherein the heat source has a bulk Fourier number that is characteristic heating time scale for the heat source and the heat sink has a bulk Fourier number that is characteristic cooling time scale for the heat sink.

24. A device of claim 1, wherein the heat engine includes a thermoelectric generator.

25. A device of claim 1, wherein the device includes a thermal resistor between the heat source and the heat sink.

26. A device of claim 1, wherein the device includes a thermal resistor between the heat sink and ambient temperature blocks.

27. A device of a gas-fired chiller comprising the pulsed heat flux of a device for thermal energy harvesting comprising:
a heat source that generates pulsed heat, wherein the pulsed heat is periodic, intermittent or oscillating;
a heat engine thermally connected to the heat source by a first thermal conduit and
a heat sink thermally connected to the heat engine by a second thermal conduit,
wherein the pulsed heat is produced by a pulsed heat flux from the heat source;
wherein the heat source configures to achieve pulsed heat transfer across the heat engine;
wherein the heat engine converts the pulsed heat; and
wherein the heat sink dissipates heat,
and a combustor configured to be switched on an off.

28. A device of an energy converter comprising the pulsed heat flux of a device for thermal energy harvesting comprising:
a heat source that generates pulsed heat, wherein the pulsed heat is periodic, intermittent or oscillating;
a heat engine thermally connected to the heat source by a first thermal conduit and
a heat sink thermally connected to the heat engine by a second thermal conduit,
wherein the pulsed heat is produced by a pulsed heat flux from the heat source;
wherein the heat source configures to achieve pulsed heat transfer across the heat engine;
wherein the heat engine converts the pulsed heat and
wherein the heat sink dissipates heat.

29. A device for thermal energy harvesting comprising:
a heat source that generates pulsed heat, wherein the pulsed heat is periodic, intermittent or oscillating;
a heat engine thermally connected to the heat source by a first thermal conduit; and
a heat sink thermally connected to the heat engine by a second thermal conduit;
wherein the heat source configures to achieve pulsed heat transfer across the heat engine, wherein the pulsed heat is produced by a pulsed heat flux from the heat source and the pulsed heat flux includes an intermittently flowing heat transfer fluid or an oscillating heat flux;
wherein the heat engine converts the pulsed heat; and
wherein the heat sink dissipates heat.

* * * * *